(12) United States Patent
Ebeling

(10) Patent No.: US 10,550,917 B2
(45) Date of Patent: *Feb. 4, 2020

(54) SLIDE-GLIDE PRIVACY BLIND BARRIER SYSTEM

(71) Applicant: Cordell E. Ebeling, Isanti, MN (US)

(72) Inventor: Cordell E. Ebeling, Isanti, MN (US)

(*) Notice: Subject to any disclaimer, the term of this patent is extended or adjusted under 35 U.S.C. 154(b) by 26 days.

This patent is subject to a terminal disclaimer.

(21) Appl. No.: 15/231,567

(22) Filed: Aug. 8, 2016

(65) Prior Publication Data

US 2017/0130461 A1 May 11, 2017

Related U.S. Application Data

(63) Continuation-in-part of application No. 14/211,017, filed on Mar. 14, 2014, now Pat. No. 9,410,351.

(60) Provisional application No. 61/783,519, filed on Mar. 14, 2013.

(51) Int. Cl.
| | |
|---|---|
| *E04F 11/18* | (2006.01) |
| *F16H 19/04* | (2006.01) |
| *E04B 1/19* | (2006.01) |
| *E06B 9/24* | (2006.01) |

(52) U.S. Cl.
CPC ........... *F16H 19/04* (2013.01); *E04B 1/1903* (2013.01); *E06B 9/24* (2013.01); *E04F 2011/1872* (2013.01); *E04F 2011/1876* (2013.01)

(58) Field of Classification Search
CPC ..... E06B 3/46; E06B 9/01; E06B 9/02; E06B 9/04; E06B 7/082; E06B 7/08; E04H 17/00; E04H 17/14; E04H 17/1421; E04H 17/1443; E04H 2017/1447; E04H 2017/1482; E04H 2017/1495; E04F 11/18; E04F 11/181; E04F 11/1817; E04F 11/1834; E04F 11/1836; E04F 11/1838; E04F 11/1842; E04F 2011/1819–1831; E05D 15/06; E05D 15/0604; E05D 15/0647; E05D 15/16; E05D 2015/0695; E05F 11/34; E05F 11/40; E05F 15/622; E05F 15/652; E05F 15/673
USPC ........ 160/214, 222, 216; 49/130, 74.1, 80.1; 256/24, 26, 27, 67

See application file for complete search history.

(56) References Cited

U.S. PATENT DOCUMENTS

| | | | | |
|---|---|---|---|---|
| 1,411,039 | A * | 3/1922 | Lacey .................. | E05F 15/652 49/118 |
| 1,486,012 | A * | 3/1924 | Christy ................ | F01P 7/12 123/41.04 |
| 1,531,398 | A * | 3/1925 | Hough .................. | F01P 7/10 454/318 |
| 2,123,751 | A * | 7/1938 | Solomon .............. | F24F 13/12 454/324 |
| 2,202,417 | A * | 5/1940 | Fleming .............. | G09F 11/025 40/473 |
| 2,250,059 | A | 7/1941 | Farney | |

(Continued)

*Primary Examiner* — Johnnie A. Shablack

(74) *Attorney, Agent, or Firm* — Merchant & Gould P.C.

(57) ABSTRACT

A deck system includes a baluster actuator device that moves balusters from an open position to a closed position. The movable balusters are positioned in the open position to at least partially open the baluster gaps between the stationary balusters, and the movable balusters are positioned in the closed position to close the baluster gaps between the stationary balusters. The balusters further include one or more functional modules secured to module inserts defined in the balusters.

22 Claims, 36 Drawing Sheets

(56) References Cited

U.S. PATENT DOCUMENTS

| | | | |
|---|---|---|---|
| 2,474,152 A * | 6/1949 | Levy | F24F 13/075 |
| | | | 160/222 |
| 2,595,329 A | 5/1952 | Brooks | |
| 2,607,452 A * | 8/1952 | Hall | E06B 7/084 |
| | | | 49/77.1 |
| 2,618,087 A * | 11/1952 | Hutchison, Jr. | G09F 11/025 |
| | | | 352/81 |
| 2,642,634 A * | 6/1953 | Recob | E04F 10/08 |
| | | | 49/38 |
| 2,759,410 A * | 8/1956 | Hurt, Jr. | F24F 13/075 |
| | | | 454/319 |
| 2,789,792 A * | 4/1957 | Davis | E04H 17/1417 |
| | | | 256/24 |
| 2,833,066 A * | 5/1958 | Morrissey | G09F 19/12 |
| | | | 40/438 |
| 2,888,182 A * | 5/1959 | Nixon | E04F 11/06 |
| | | | 182/1 |
| 2,991,843 A | 7/1961 | Bell | |
| 3,137,043 A * | 6/1964 | Moeller | E06B 9/367 |
| | | | 160/178.1 R |
| 3,342,458 A * | 9/1967 | Simonton | E04H 17/1434 |
| | | | 256/24 |
| 3,412,506 A * | 11/1968 | Masayoshi | B60J 1/2088 |
| | | | 296/152 |
| 3,444,919 A | 5/1969 | Karoll | |
| 3,484,969 A * | 12/1969 | Newland | G09F 11/00 |
| | | | 40/437 |
| 3,564,770 A | 2/1971 | Korbelic | |
| 3,613,277 A * | 10/1971 | Rose et al. | G09F 11/025 |
| | | | 40/491 |
| 3,775,906 A | 12/1973 | Dougherty | |
| 3,785,475 A | 1/1974 | Maynard | |
| 4,033,073 A | 7/1977 | Bogan | |
| 4,099,346 A * | 7/1978 | Isono | E04B 7/163 |
| | | | 160/236 |
| 4,229,907 A * | 10/1980 | Hall | E05F 15/652 |
| | | | 49/362 |
| 4,465,262 A | 8/1984 | Itri et al. | |
| 4,469,132 A * | 9/1984 | Redington | F24F 13/15 |
| | | | 137/601.06 |
| 4,485,589 A * | 12/1984 | Rodriguez-Torres | E06B 9/01 |
| | | | 49/38 |
| 4,688,618 A | 8/1987 | Saicheck, Jr. et al. | |
| 4,698,938 A * | 10/1987 | Huber | F16H 25/2018 |
| | | | 49/138 |
| 4,709,506 A * | 12/1987 | Lukaszonas | E06B 9/367 |
| | | | 454/318 |
| 4,722,514 A * | 2/1988 | Pettit | E04H 17/1421 |
| | | | 256/19 |
| 4,893,551 A | 1/1990 | Sharp et al. | |
| 4,914,859 A | 4/1990 | Gionet et al. | |
| 5,016,390 A | 5/1991 | Johnson | |
| 5,076,545 A | 12/1991 | Bodzin | |
| 5,155,936 A | 10/1992 | Johnson | |
| 5,422,552 A | 6/1995 | Parisi | |
| 5,570,543 A | 11/1996 | Bishop | |
| 5,782,039 A | 7/1998 | Scherer et al. | |
| 5,878,695 A | 3/1999 | Gent | |
| 6,076,592 A | 6/2000 | Grutzner | |
| 6,126,145 A * | 10/2000 | Mohr | E04H 17/1439 |
| | | | 256/21 |
| 6,148,571 A * | 11/2000 | Seyller | E04B 7/166 |
| | | | 52/1 |
| 6,269,568 B1 * | 8/2001 | Lo | G09F 11/025 |
| | | | 40/503 |
| 6,305,670 B1 | 10/2001 | Ward et al. | |
| 6,460,829 B1 * | 10/2002 | Forbis | E04H 17/1417 |
| | | | 256/67 |
| 6,481,167 B2 * | 11/2002 | Liddell | E06B 7/086 |
| | | | 52/198 |
| 6,581,332 B1 | 6/2003 | Kim | |
| 6,601,831 B2 | 8/2003 | Erwin | |
| 6,702,259 B2 | 3/2004 | Pratt | |
| 6,857,236 B2 * | 2/2005 | Mangeard | E04B 7/166 |
| | | | 454/199 |
| 6,945,518 B1 | 9/2005 | Chrysler | |
| 6,968,660 B1 * | 11/2005 | Novoa | E06B 3/7005 |
| | | | 49/74.1 |
| 7,032,891 B2 | 4/2006 | Rowley et al. | |
| 7,040,056 B2 * | 5/2006 | DuBose | E05D 15/0665 |
| | | | 49/116 |
| 7,040,605 B2 * | 5/2006 | Lappen | E04H 17/16 |
| | | | 136/245 |
| 7,185,943 B2 * | 3/2007 | Lesle | E05F 15/652 |
| | | | 296/146.16 |
| 7,389,975 B2 | 6/2008 | Rowley et al. | |
| 7,441,919 B2 * | 10/2008 | Sheridan | E04F 11/18 |
| | | | 362/151 |
| 7,537,091 B2 * | 5/2009 | Fargo | B66B 13/08 |
| | | | 187/316 |
| 7,568,449 B2 | 8/2009 | Hirokawa et al. | |
| 7,571,896 B2 * | 8/2009 | Bonham | E04H 4/06 |
| | | | 256/26 |
| 7,673,853 B2 | 3/2010 | Ebeling | |
| 7,832,052 B2 | 11/2010 | Vrielink | |
| 8,002,642 B2 | 8/2011 | Guerzini et al. | |
| 8,011,149 B2 * | 9/2011 | Knudsen | E04H 12/2269 |
| | | | 52/165 |
| 8,015,752 B2 | 9/2011 | Fullerton et al. | |
| 8,141,517 B2 | 3/2012 | Shimoda et al. | |
| 8,302,938 B2 * | 11/2012 | Ebeling | E04H 17/16 |
| | | | 256/1 |
| 8,474,185 B2 * | 7/2013 | Busch | E05F 15/652 |
| | | | 49/358 |
| 8,572,894 B2 | 11/2013 | Busch | |
| 8,572,896 B2 * | 11/2013 | Busch | E05D 15/0652 |
| | | | 49/360 |
| 9,074,401 B2 * | 7/2015 | Jensen | E06B 3/46 |
| 9,410,351 B2 * | 8/2016 | Ebeling | E05D 15/0621 |
| 9,631,426 B1 * | 4/2017 | Caspa | E06B 9/68 |
| 2002/0070377 A1 * | 6/2002 | Erwin | E04H 17/1417 |
| | | | 256/1 |
| 2002/0157291 A1 * | 10/2002 | Lin | G09F 11/025 |
| | | | 40/505 |
| 2003/0136068 A1 * | 7/2003 | Forbis | E04H 12/2261 |
| | | | 52/296 |
| 2003/0159355 A1 * | 8/2003 | Froerer | E06B 7/086 |
| | | | 49/74.1 |
| 2006/0076545 A1 | 4/2006 | Reynders et al. | |
| 2006/0202186 A1 | 9/2006 | Rowley et al. | |
| 2006/0260159 A1 * | 11/2006 | Ajumobi | G09F 11/025 |
| | | | 40/513 |
| 2007/0199216 A1 * | 8/2007 | Atkinson | G09F 11/025 |
| | | | 40/503 |
| 2007/0278468 A1 * | 12/2007 | Zacarias | E04H 17/16 |
| | | | 256/24 |
| 2008/0087874 A1 * | 4/2008 | Ebeling | E04H 17/16 |
| | | | 256/67 |
| 2008/0099751 A1 * | 5/2008 | Chen | E04H 17/00 |
| | | | 256/19 |
| 2008/0163549 A1 | 7/2008 | Kim | |
| 2008/0198584 A1 * | 8/2008 | Fouraux | E04F 13/145 |
| | | | 362/147 |
| 2009/0071074 A1 | 3/2009 | Yates | |
| 2009/0134377 A1 | 5/2009 | Petta et al. | |
| 2009/0200531 A1 | 8/2009 | Rowley et al. | |
| 2009/0250176 A1 | 10/2009 | Ryan et al. | |
| 2009/0321697 A1 * | 12/2009 | Robinson | E04H 17/1439 |
| | | | 256/26 |
| 2010/0159817 A1 | 6/2010 | Lindgren | |
| 2010/0237308 A1 | 9/2010 | Lo | |
| 2010/0288264 A1 * | 11/2010 | Zhang | E04H 17/16 |
| | | | 126/563 |
| 2011/0198549 A1 | 8/2011 | Hirokawa et al. | |
| 2011/0283632 A1 * | 11/2011 | Sutton | A47B 46/005 |
| | | | 52/36.1 |
| 2012/0159853 A1 | 6/2012 | Mickelson | |
| 2012/0174484 A1 | 7/2012 | Toro | |
| 2012/0217460 A1 | 8/2012 | Bugh | |

(56) References Cited

U.S. PATENT DOCUMENTS

| | | | |
|---|---|---|---|
| 2012/0233922 A1* | 9/2012 | Flannery | E06B 7/32 |
| | | | 49/55 |
| 2012/0235101 A1 | 9/2012 | Flannery et al. | |
| 2012/0240485 A1* | 9/2012 | Amarasinghe | F24J 2/5203 |
| | | | 52/127.1 |
| 2012/0319067 A1 | 12/2012 | Millar | |
| 2013/0320281 A1* | 12/2013 | Richison | B23P 11/00 |
| | | | 256/24 |
| 2014/0007506 A1 | 1/2014 | Huang | |
| 2014/0124722 A1 | 5/2014 | Mann | |
| 2014/0190641 A1 | 7/2014 | Wang | |
| 2014/0338845 A1* | 11/2014 | Ebeling | E05D 15/0621 |
| | | | 160/214 |
| 2015/0047860 A1 | 2/2015 | Rutherford | |
| 2015/0082721 A1 | 3/2015 | Francescon | |
| 2015/0089873 A1 | 4/2015 | Marsden et al. | |
| 2015/0247341 A1 | 9/2015 | Bizzarri | |
| 2018/0094451 A1* | 4/2018 | Peter | E04H 17/14 |

* cited by examiner

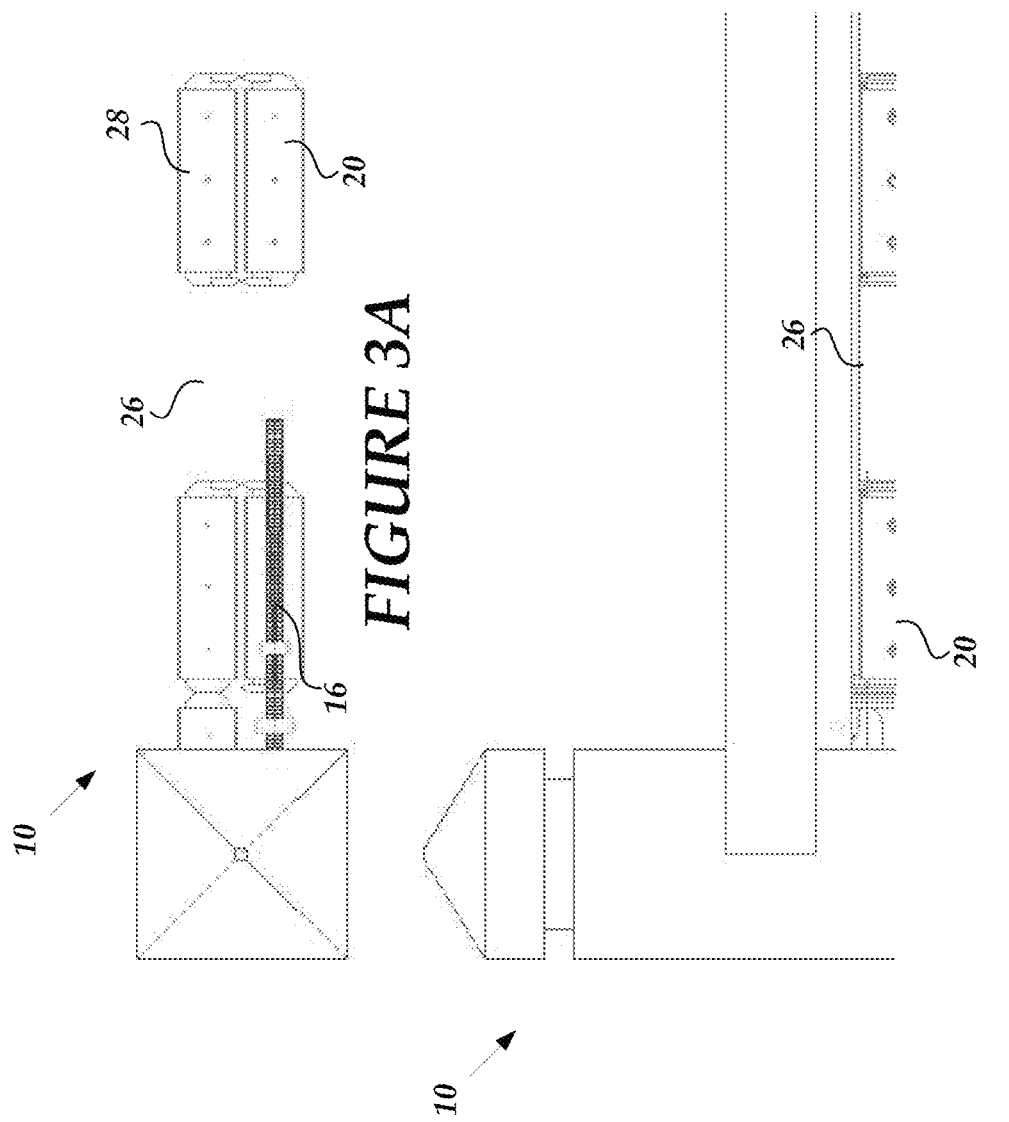

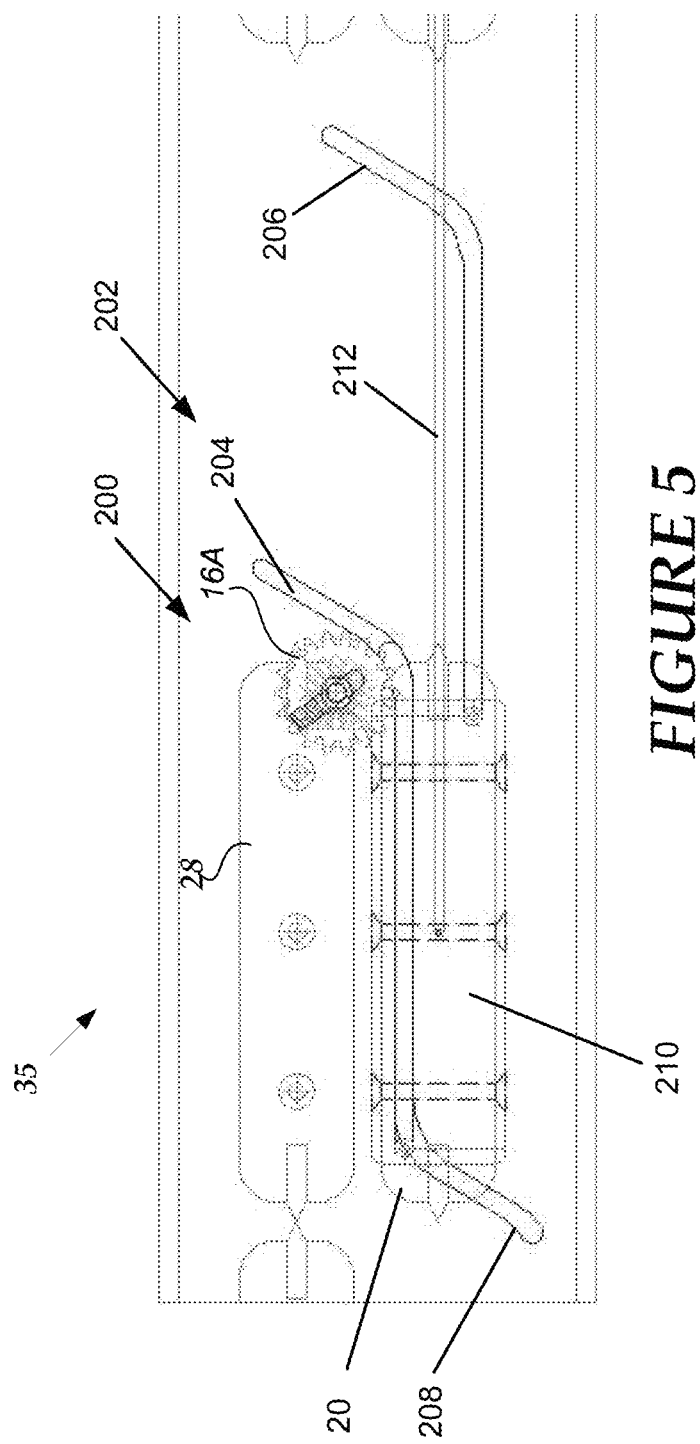

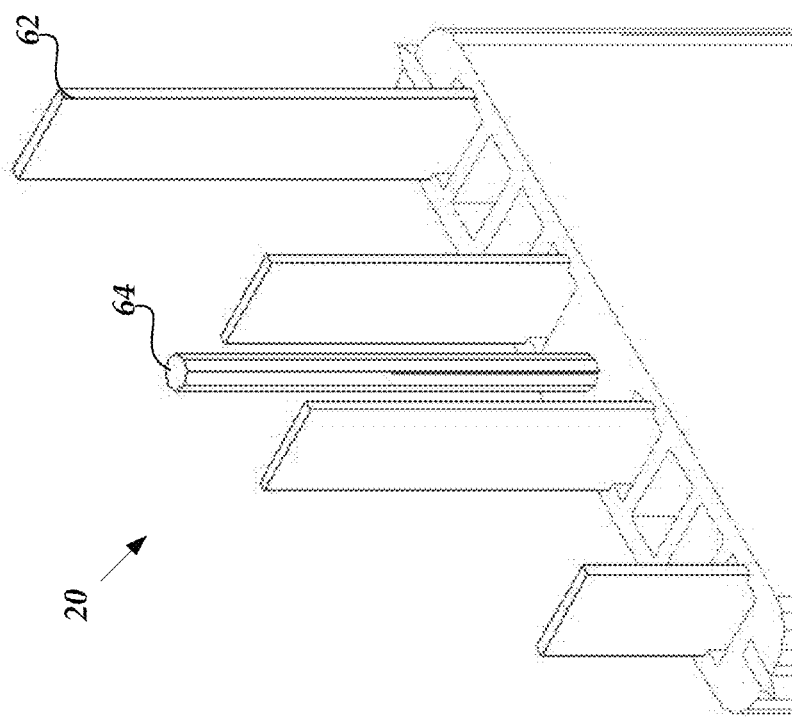

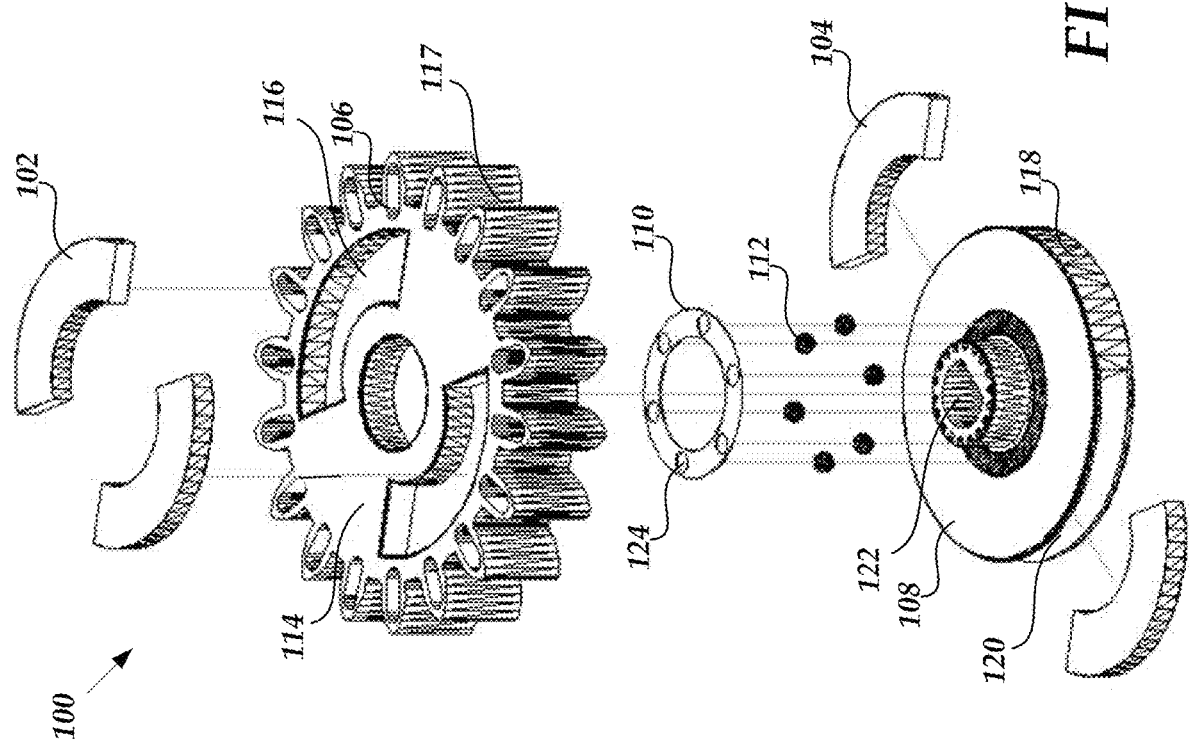

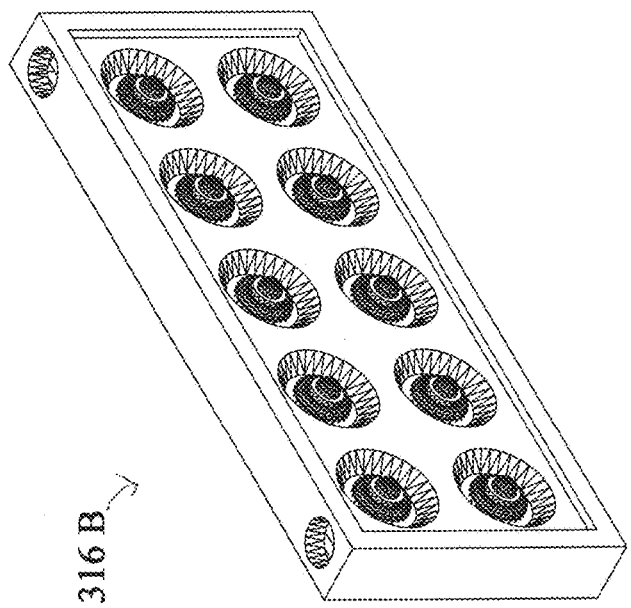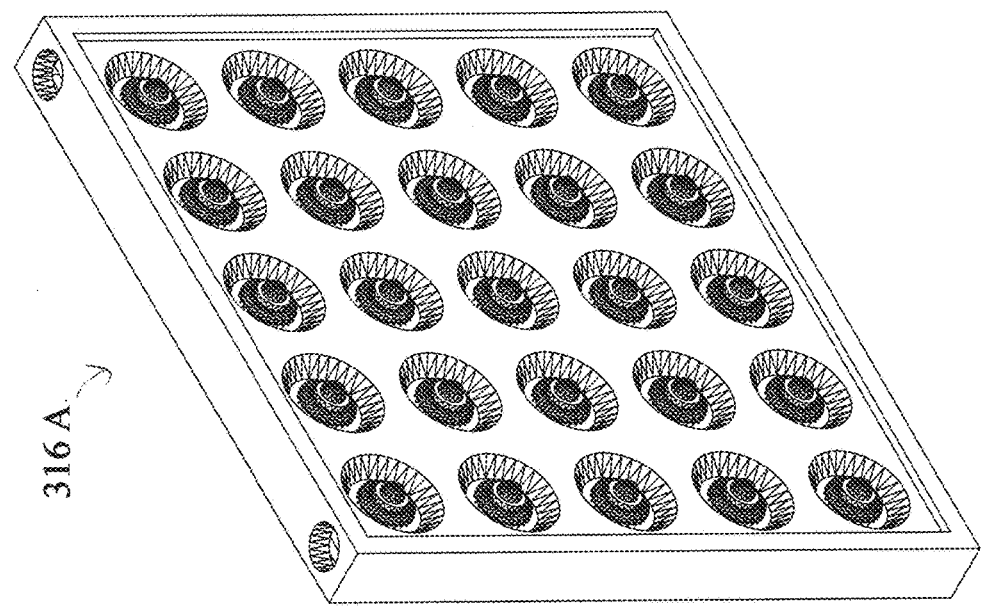
FIGURE 18

SLIDE-GLIDE PRIVACY BLIND BARRIER SYSTEM

CROSS-REFERENCE TO RELATED APPLICATION(S)

This application is a continuation-in-part of U.S. Pat. No. 9,410,351, issued on Aug. 9, 2016, titled SLIDE-GLIDE PRIVACY BLIND BARRIER SYSTEM, which claims priority to U.S. Patent Application Ser. No. 61/783,519, filed on Mar. 14, 2013, titled SLIDE-GLIDE PRIVACY BLIND BARRIER SYSTEM, the disclosures of which are hereby incorporated by reference in their entireties.

BACKGROUND

The home improvement industry has seen significant growth in the last decade and is projected to continue to grow in the future. For example, in a Jan. 14, 2011 report from Harvard University on the home improvement industry it is estimated that in 2005 alone, consumers spent over a quarter of a trillion dollars on home improvement projects, and that this number has been growing at a rate of about 7% per year. As a result, manufacturers and retailers spend significant effort in trying to differentiate their products from the competition.

One commonly undertaken home improvement project involves adding fences, railings, outdoor-rooms and similar barrier structures (e.g., outdoor kitchens) to homes and landscaping. Railings and fences are often added for aesthetic and practical reasons, such as to add interest to landscaping or to provide a privacy barrier and block weather elements, such as wind. In other applications, railings and fences may be practical or mandatory. For example, a raised deck (i.e., above two feet off of the ground) will require railings to comply with higher standard building safety codes. Some codes require at least 200 lb lateral load. Composite decking is commonly used as deck flowing or railings, but is not rigid enough to meet the code requirement if the railings has a longer height.

Standard deck railings and fences are typically constructed using a series of posts anchored to the ground as structural supports, decking or flooring structures and the outer walls of permanent building structures (also used as structural supports). The posts are connected via generally rectangular planar sections that provide a containment function, such as preventing the passage of people or animals, and "view blockage" from different perspectives. In many fencing and railing systems, these sections are formed by top and bottom vertical railings that are tied together by a plurality of vertical members (sometimes referred to as balusters) which form open sections in a deck railing or fence barrier. In other arrangements, the top and bottom railings are tied together (or integral with) a solid sheet of material, such as mesh, glass, metal, wood, composites, or lattice configurations. Sections that form a permanent containment barrier structure are only offered in two standard modes, open and solid sections. In modes offering open sections, there is a multitude of secondary add-on privacy screening available. In addition, there are advantages and disadvantages associated with solid fencing/railing sections and open sections that use balusters. For example, the solid sections can block wind and prevent the passage of very small items and can offer privacy from neighbors or onlookers looking in from an outside perspective of the containment barrier structure. However, blocking the view of what is on the outer side or the inner side of a barrier fence or railing can sometimes be a disadvantage. An open section provides a view through the railing, with the resulting loss of privacy. Oftentimes, a user may desire the privacy of a solid section during some conditions and also, under other conditions, desire the outward-looking view provided by open sections. Thus, there is a need for a fence or railing that selectably offers consumers the convenience of combining both open and solid closed barrier sections and that offers the advantages of personal preferences to convert between these structure sections depending on current use conditions and that will also meet various safety code standards (e.g., International Code Council (ICC), American Fence Association, and U.S. Department of Labor and Industry Construction Codes and Licensing Division standards) such as providing 200 pounds of lateral pressure. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide a convertible slide-glide panel privacy system (or blind barrier section system, hereinafter "the system") for deck railings or fences. The system may consist of two or more identical panel sections. A first panel section may consist of a stationary panel. A second (or more) of the identical panel sections may be in an opposite facing orientation with respect to the first panel section and may be configured to slide in between the most outer stationary structural supports (i.e., an upper railing, a lower railing and posts) of a deck railing or fence in order to either cover or open an existing space or gap between stationary balusters. The stationary panel may be attached directly under the top railing and attached slide pieces. The sliding path of the second (or more) panel sections may be either linear or curvilinear. The sliding panel sections in the system may be constructed from a combination of or individually from the following materials: composites, wood, metals, glass, lattice, PVC and transparent thermoplastics such as Polymethyl methacrylate ("PMMA"), also known as PLEXIGLASS. The system may be either manually or automatically operated. These and other features and advantages will be apparent from a reading of the following detailed description and a review of the associated drawings. It is to be understood that both the foregoing general description and the following detailed description are illustrative only and are not restrictive of the invention as claimed.

One aspect is a deck system comprising a plurality of stationary balusters, a plurality of movable balusters, and a baluster actuator. The plurality of stationary balusters is disposed between an upper railing device and a lower railing device. The stationary balusters are arranged at a predetermined distance to define baluster gaps therebetween. The plurality of movable balusters is disposed between the upper railing device and the lower railing device. The movable balusters are arranged substantially at the predetermined distance. The plurality of movable balusters is movable relative to the plurality of stationary balusters. The baluster actuator device is configured to move the plurality of movable balusters from an open position to a closed position. The plurality of movable balusters are positioned in the open position to at least partially open the baluster gaps between the stationary balusters, and the plurality of movable balusters are positioned in the closed position to close the baluster gaps between the stationary balusters.

Another aspect is a baluster for a deck system, the baluster comprising a baluster panel unit defining a module insert, and one or more functional modules configured to be secured to the module insert.

Yet another aspect is a method for providing a baluster for a deck system. The method comprising: removing a full length filler insert module from a module insert of a baluster panel unit; inserting one or more functional modules in the module insert at a predetermined order; cutting the full length filler insert module into one or more pieces of filler insert modules; and inserting the one or more pieces of filler insert modules in the module insert to fill one or more gaps between the functional modules in the module insert.

BRIEF DESCRIPTION OF THE DRAWINGS

FIG. 3A is a top view of a slide-glide panel privacy system in an open orientation, in accordance with an embodiment;

FIG. 3B is a front view of a slide-glide panel privacy system in an open orientation, in accordance with an embodiment;

FIG. 5 is a top view of a slide-glide panel privacy system in an open orientation, in accordance with an alternative embodiment;

FIG. 8 is a perspective view of lateral reinforced inserts for balusters utilized in a slide-glide panel privacy system, in accordance with an embodiment.

FIG. 9 is an exploded view of a further example cylindrical safety slip mechanism.

FIG. 18 schematically illustrates different examples of the speaker module.

DETAILED DESCRIPTION

Embodiments provide a convertible slide-glide panel privacy system (or blind barrier section system, hereinafter "the system") for deck railings or fences. The system may consist of two or more identical panel sections. A first panel section may consist of a stationary panel. A second (or more) of the identical panel sections may be in an opposite facing orientation with respect to the first panel section and may be configured to slide in between the most outer stationary structural supports (i.e., an upper railing, a lower railing and posts) of a deck railing or fence in order to either cover or open an existing space or gap between stationary balusters. The stationary panel may be attached directly under the top railing and attached slide pieces. The sliding path of the second (or more) panel sections may be either linear or curvilinear. The sliding panel sections in the system may be constructed from a combination of or individually from the following materials: composites, wood, metals, glass, lattice, PVC and transparent thermoplastics such as Polymethyl methacrylate ("PMMA"), also known as PLEXIGLASS. The system may be either manually or automatically operated.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1A:
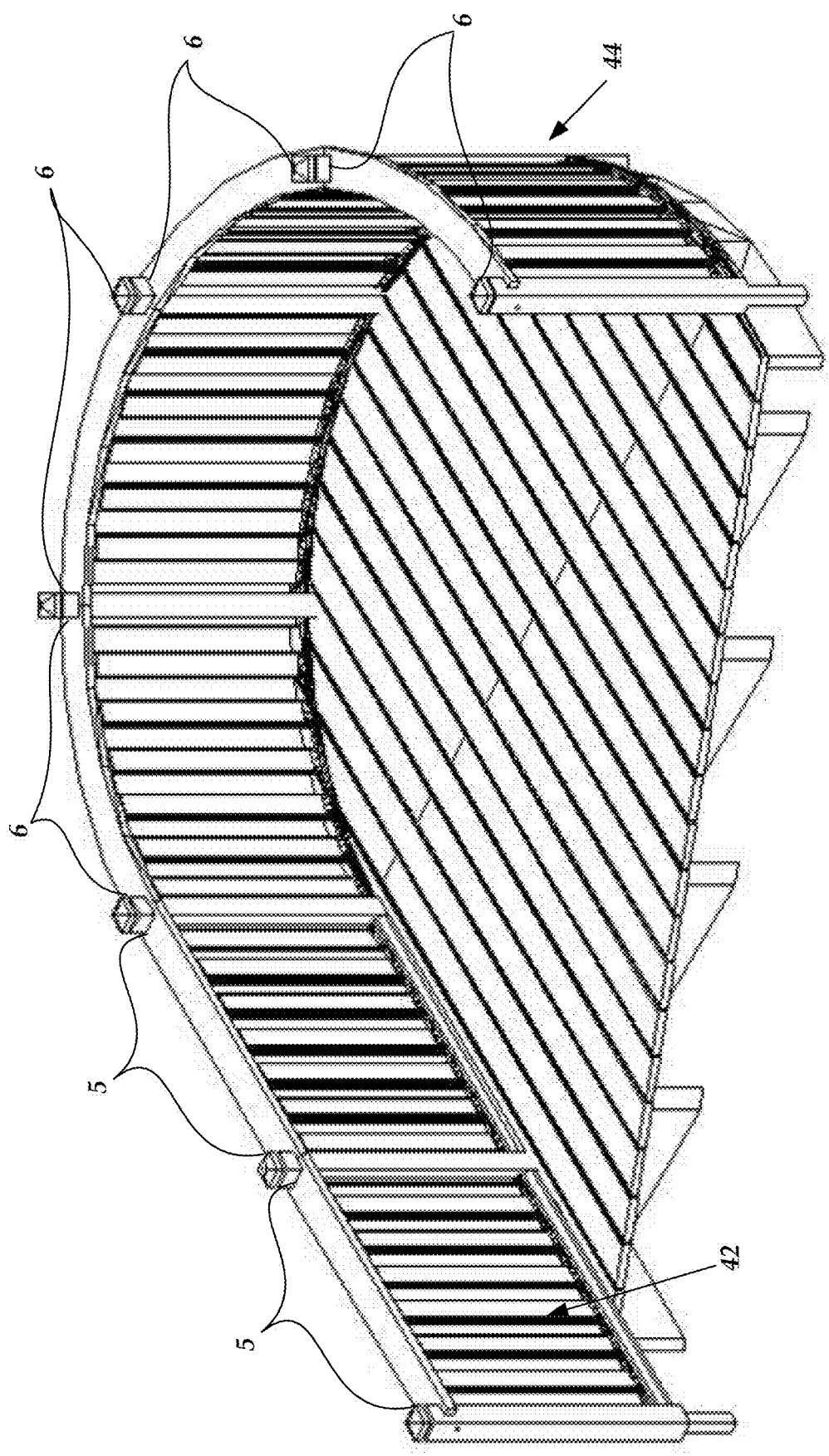
FIG. 1A is a perspective view of a deck incorporating a slide-glide panel privacy system, in accordance with an embodiment.

Referring now to the drawings, in which like numerals represent like elements through the several figures, various aspects of the present invention will be described. FIG. 1A is a perspective view is a perspective view of a deck incorporating a slide-glide panel privacy system, in accordance with an embodiment. The deck includes separate straight slide-glide panel sections (or barrier panels) 5 and curvilinear slide-glide panel sections (or barrier panels) 6. It should be understood that each of the individual panel sections 5 and 6 may operate independently or in concert with each other and may further be operated either manually or with automation (i.e., automatically).

Figure 1B:
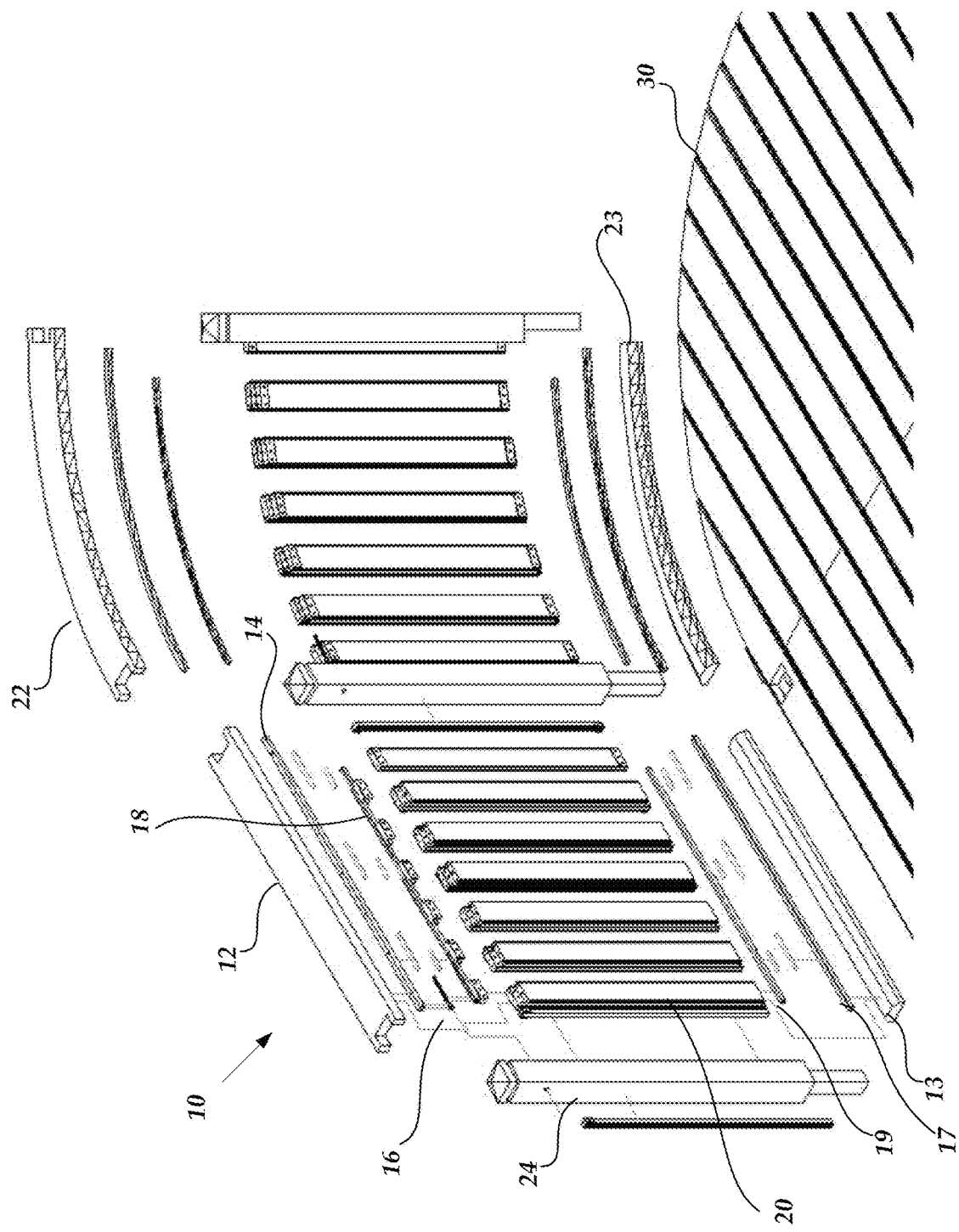
FIG. 1B is a partially exploded view of a deck railing incorporating a slide-glide panel privacy system, in accordance with an embodiment.

FIG. 1B is a partially exploded view of a deck railing 10 and a deck 30 incorporating the system, in accordance with an embodiment. The deck railing 10 may be comprised of one or more posts 24, straight top rail 12, curvilinear top rail 22, straight bottom rail 13, curvilinear bottom rail 23 and multiple sets of opposing balusters 20 and 28 which integrally utilize upper and lower slide-glides. As should be understood by those skilled in the art, the balusters 20 and 28 may comprise vertical members which tie together the top and bottom rails 12, 13, 22 and 23 and which form open sections in the deck railing 10. It should be understood however, that in accordance with alternative embodiments, the deck railing 10 may be tied together with a solid material such as mesh, glass, metal, wood, composites, etc. It should further be understood that, in accordance with various embodiments, the deck railing 10 may comprise one or more sections which may include one or more straight sections, one or more curvilinear barrier sections or a combination of both straight and curvilinear sections.

The system may comprise an upper channel 14, a control screw 16, the balusters 28 (which utilize integral slide-glides), a lower channel 18, an upper bottom channel 19 and a lower bottom channel 17, which are integrally positioned directly above and below the balusters 20. As will be described in greater detail below, the system may be utilized to cover existing spaces or gaps between stationary balusters comprising a deck railing in order to provide privacy as desired and as defined by a user's discretion.

Figures 2A, 2B:
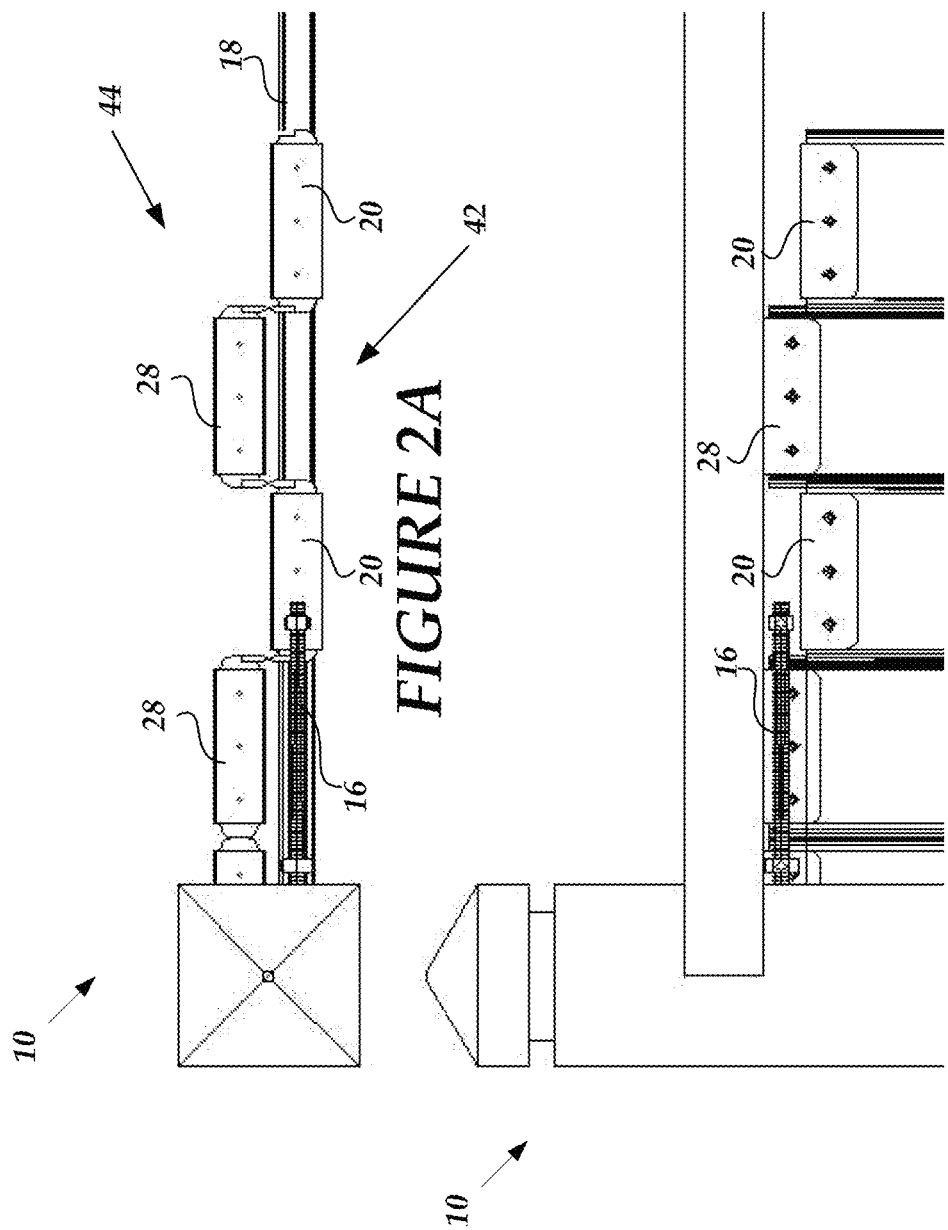
FIG. 2A is a top view of a slide-glide panel privacy system in a closed orientation, in accordance with an embodiment.
FIG. 2B is a front view of a slide-glide panel privacy system in a closed orientation, in accordance with an embodiment.

FIG. 2A is a top view of the system in a closed orientation, in the deck railing 10, in accordance with an embodiment. As shown in FIG. 2A, the balusters 20 in the deck railing 10 have been moved from their previous positions opposite the stationary balusters 28 to close the gaps or spaces between the balusters. As will be described in greater detail herein, the control screw 16 may be actuated (by either manual or automated means) to slide the balusters 20 in the lower channel 18 until they are seated in the gaps or spaces between the stationary balusters 28. In particular, the control screw 16 may be rotated in a first direction (i.e., a counter-clockwise direction) to push the balusters 20 from their initial position opposing the stationary balusters 28 to their final position over the gaps or spaces in the deck railing 10.

It should be understood that the system described in the aforementioned embodiment may utilize a number of different means of sliding movement and also utilize various track system configurations. In accordance with an embodiment, the system may utilize a combination of wheels, bearings, hangers (such as those used in garage door systems in which the door hangs on a shaft having wheels) and pin-shafts which travel on and in-between the upper and lower channels 14 and 18. In accordance with another embodiment, the system may utilize a combination of opposing magnets which travel on and in-between the upper and lower channels 14 and 18. It should be appreciated that the use of the opposing magnets facilitates a frictionless or nearly frictionless slide movement of the system from an open state or multiple user-defined semi-closed configurations. Other combinations may also be utilized.

FIG. 2B is a front view of the system in a closed orientation, in the deck railing 10, in accordance with an embodiment. As shown in FIG. 2B, the balusters 20 in the deck railing 10 have been moved, via the rotation of the control screw 16, from their previous positions opposite the stationary balusters 28 to close the gaps or spaces between the balusters. It should be understood that the balusters 20 may be shorter than the stationary balusters 28 to facilitate the sliding of the balusters 20 in the upper channel 14.

FIG. 3A is a top view of the system in an open orientation, in the deck railing 10, in accordance with an embodiment. As shown in FIG. 3A, the balusters 20 in the deck railing 10 are oriented opposite the stationary balusters 28 thereby forming gaps or spaces 26 between the balusters in the deck railing 10. As will be described in greater detail herein, the control screw 16 may be actuated (by either manual or automated means) to slide the balusters 20 in the lower channel 18 until they are oriented opposite the stationary balusters 28. In particular, the control screw 16 may be rotated in a second direction (i.e., a clockwise direction) to pull the balusters 20 from a closed orientation, in which the balusters 20 fill the gaps or spaces in the deck railing 10, to an open orientation opposite the stationary balusters 28.

FIG. 3B is a front view of the system in a closed orientation, in the deck railing 10, in accordance with an embodiment. As shown in FIG. 3B, the balusters 20 in the deck railing 10 are oriented opposite the stationary balusters 28, thereby forming gaps or spaces between the balusters in the deck railing 10.

Figure 4A:
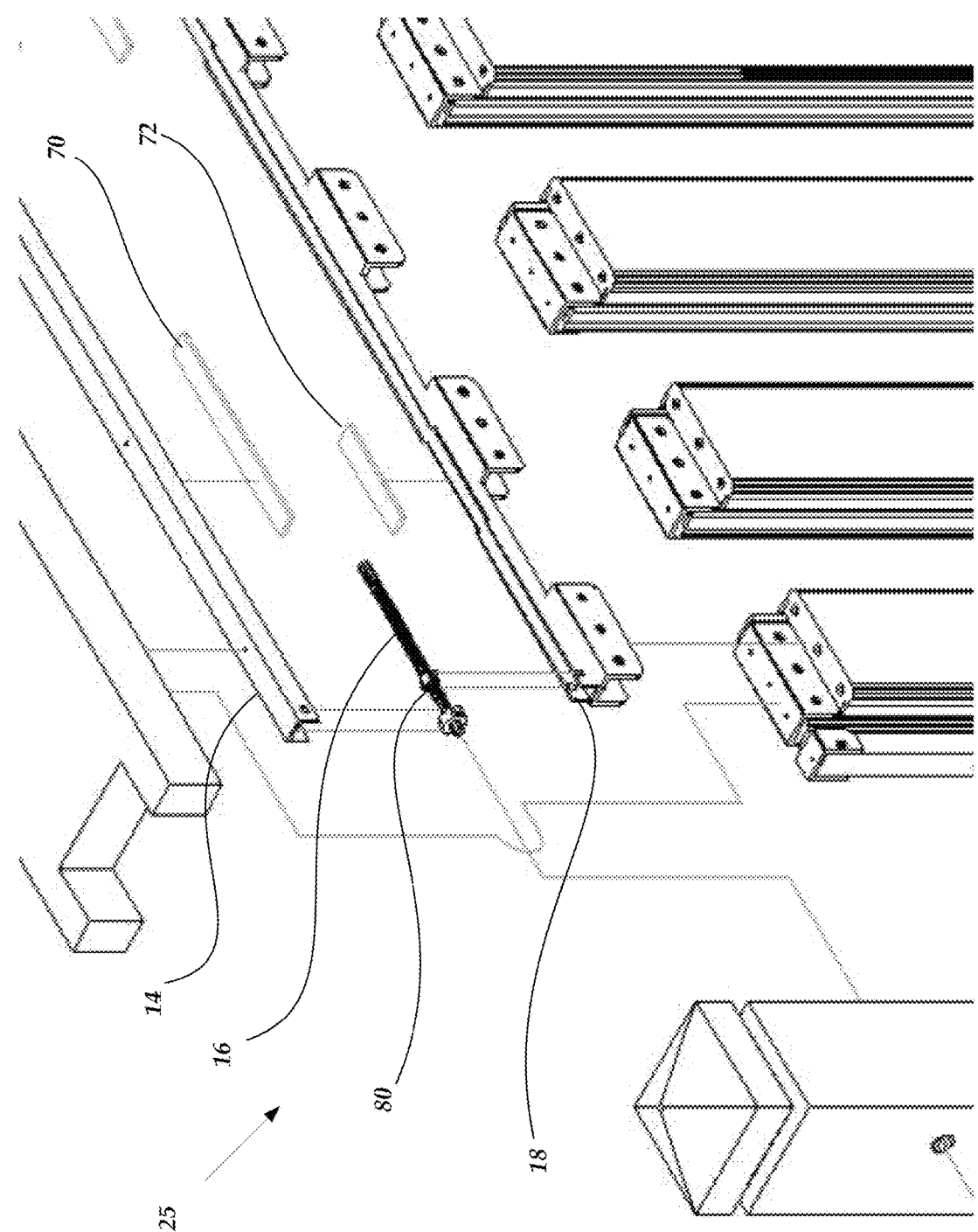
FIG. 4A is an exploded view of illustrative components utilized in a mode of operation of the slide-glide panel privacy system, in accordance with an embodiment.

FIG. 4A is an exploded view of illustrative components utilized in a mode of operation of the system, in accordance with an embodiment. In FIG. 4A, the components of a system 25 may include the upper channel 14, the control screw 16 and the lower channel 18. The control screw 16 may comprise an engaging nut 80 which may be utilized to engage openings in the lower channel 18 for pushing or pulling (depending on the direction of rotation of the control screw 16) balusters or panels of a deck railing barrier section. The system of FIG. 4A also includes two opposing magnets 70 and 72. As discussed above, the opposing magnets may be utilized for travel on and in-between the upper and lower channels 14 and 18. It should be appreciated that the use of the opposing magnets facilitates a frictionless or nearly frictionless slide movement of the system from an open state or multiple user-defined semi-closed configurations.

Figure 4B:
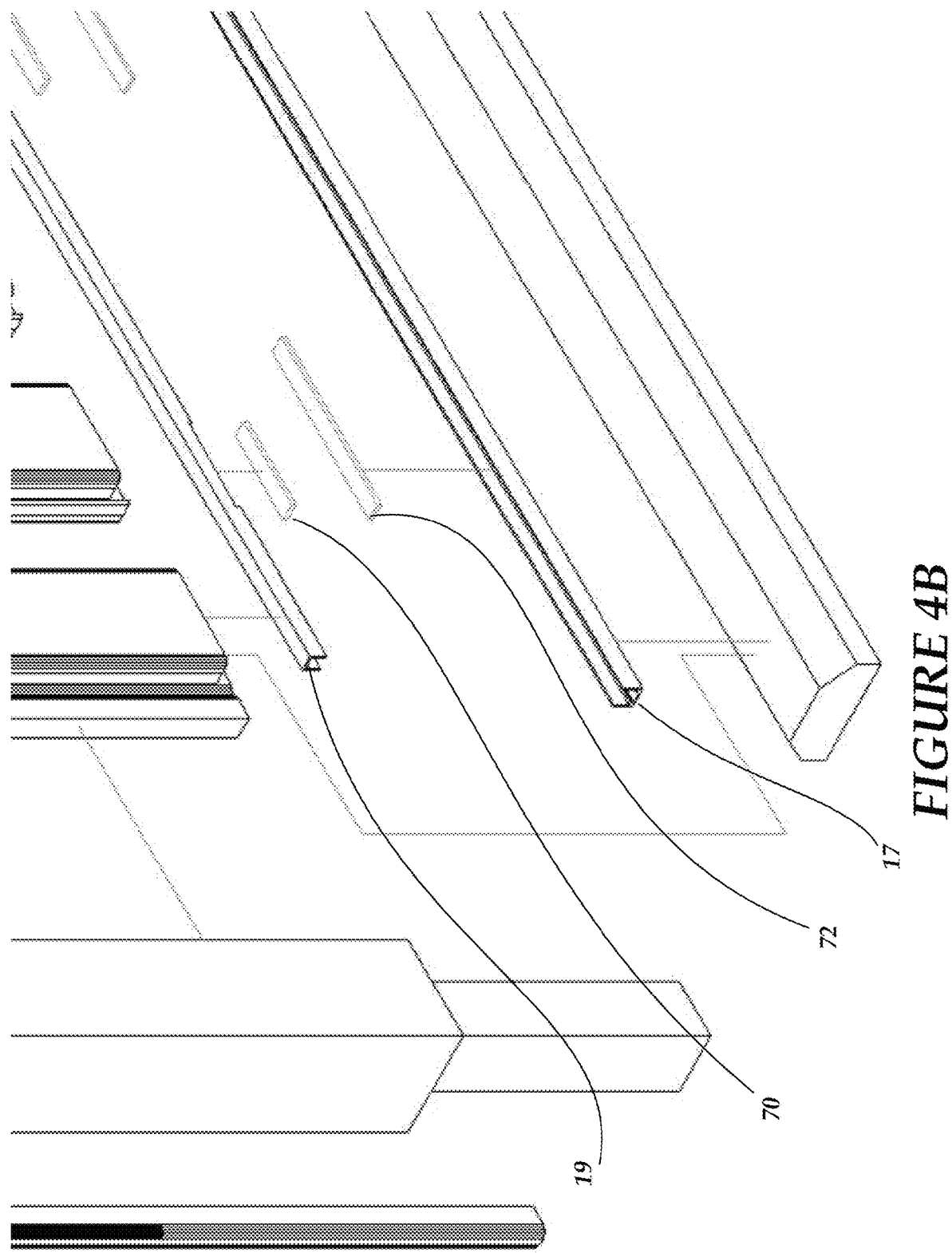
FIG. 4B is an exploded view of a bottom magnet configuration for the system of FIG. 4A, in accordance with an embodiment.

FIG. 4B is an exploded view of a bottom magnet configuration for the system of FIG. 4A, in accordance with an embodiment. As shown in FIG. 4B, the opposing magnets 70 and 72 may be positioned between the upper and lower bottom channels 19 and 17. As discussed above, the opposing magnets may be utilized for travel on and in-between the upper and lower bottom channels 19 and 17. It should be appreciated that the use of the opposing magnets facilitates a frictionless or nearly frictionless slide movement of the system from an open state or multiple user-defined semi-closed configurations.

FIG. 5 is a top view of the system in an open orientation, in accordance with an alternative embodiment. In FIG. 5, a system 35 is shown in which a rotating gear mechanism 16A may be utilized (instead of the control screw 16) for sliding the balusters 20 against the stationary balusters 28 to open spaces or gaps in a deck railing.

Figure 6:
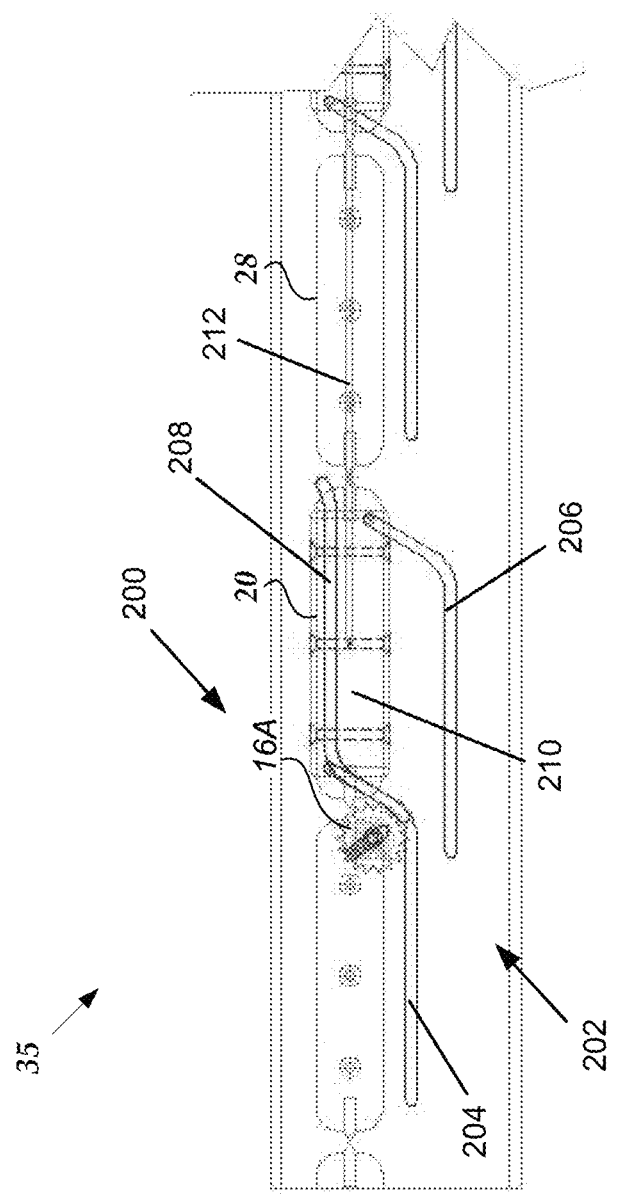
FIG. 6 is a top view of a slide-glide panel privacy blind system in a closed orientation, in accordance with an alternative embodiment.

FIG. 6 is a top view of the system in a closed orientation, in accordance with an alternative embodiment. In FIG. 6, the system 35 is shown in which the rotating gear mechanism 16A may be utilized (instead of the control screw 16) for sliding the balusters 20 against the stationary balusters 28 to close spaces or gaps in a deck railing.

Figure 7A:
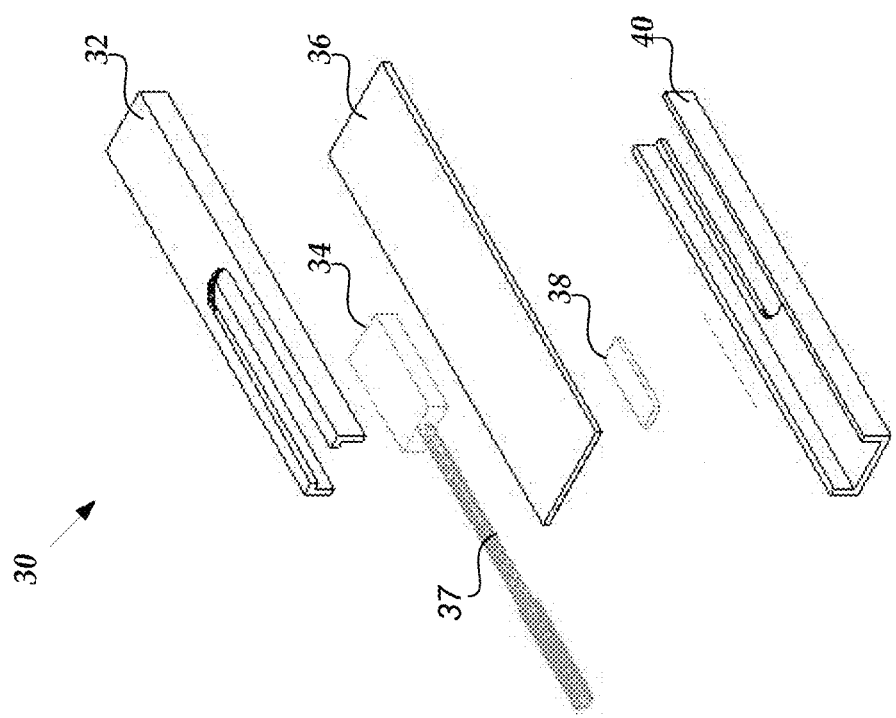
FIG. 7A is an exploded view of a bar safety slip mechanism which may be utilized in a slide-glide panel privacy system, in accordance with an embodiment.

FIG. 7A is an exploded view of a bar safety slip mechanism 30 which may be utilized in the system, in accordance with an embodiment. The bar safety slip mechanism 30 may include an upper non-magnetic housing 32, a first magnet 34, a non-magnetic separator 36, a shaft 37, a second magnet 38 and a lower non-magnetic housing 40. In accordance with an embodiment, the first and second magnets 34 and 38 have opposing polarities (i.e., one positive, one negative). It should be understood that the bar safety slip mechanism 30 may function as a magnetic decoupler in which the opposing magnets 34 and 38 attract each other inside of the upper and lower non-magnetic housings 32 and 40. The shaft 37 may be utilized to fasten to sections (e.g., balusters) of a deck railing or fence as well as to a manual or automated power source for opening and closing the aforementioned sections. In accordance with an alternative embodiment, one of the non-magnetic housings 32 or 40 may be molded into the balusters of a deck railing. It should be appreciated that the bar safety slip mechanism 30 may be utilized to decouple opening or closing of the balusters of a deck railing (such as when a person inadvertently slips their extremities (e.g., fingers) between the balusters) such that the movement of the balusters would stop thereby avoiding the pinching of the person's extremities between the balusters.

Figure 7B:
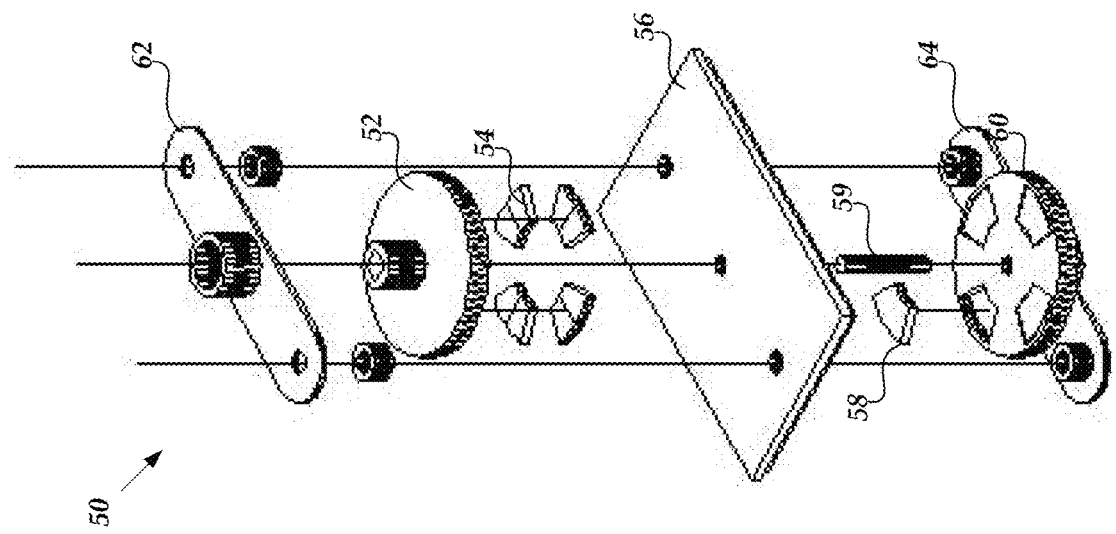
FIG. 7B is an exploded view of a cylindrical safety slip mechanism which may be utilized in a slide-glide panel privacy system, in accordance with an embodiment.

FIG. 7B is an exploded view of a cylindrical safety slip mechanism 50 which may be utilized in the system, in accordance with an embodiment. The cylindrical safety slip mechanism 50 may include an upper non-magnetic housing 52, a first set of magnets 54, a non-magnetic separator 56, a second set of magnets 58, a shaft 59, a lower magnetic housing 60, and upper and lower fastening members 62 and 64. In accordance with an embodiment, the first and second sets of magnets 54 and 58 have opposing polarities (i.e., positive and negative). It should be understood that the cylindrical safety slip mechanism 50 may function as a magnetic decoupler in which the opposing magnet sets 54 and 58 attract each other inside of the upper and lower non-magnetic housings 52 and 60. It should be appreciated that the cylindrical safety slip mechanism 50 may be utilized to decouple opening or closing of the balusters of a deck railing (such as when a person inadvertently slips their extremities between the balusters) such that the movement of the balusters would stop thereby avoiding the pinching of the person's extremities between the balusters.

Figure 7C:
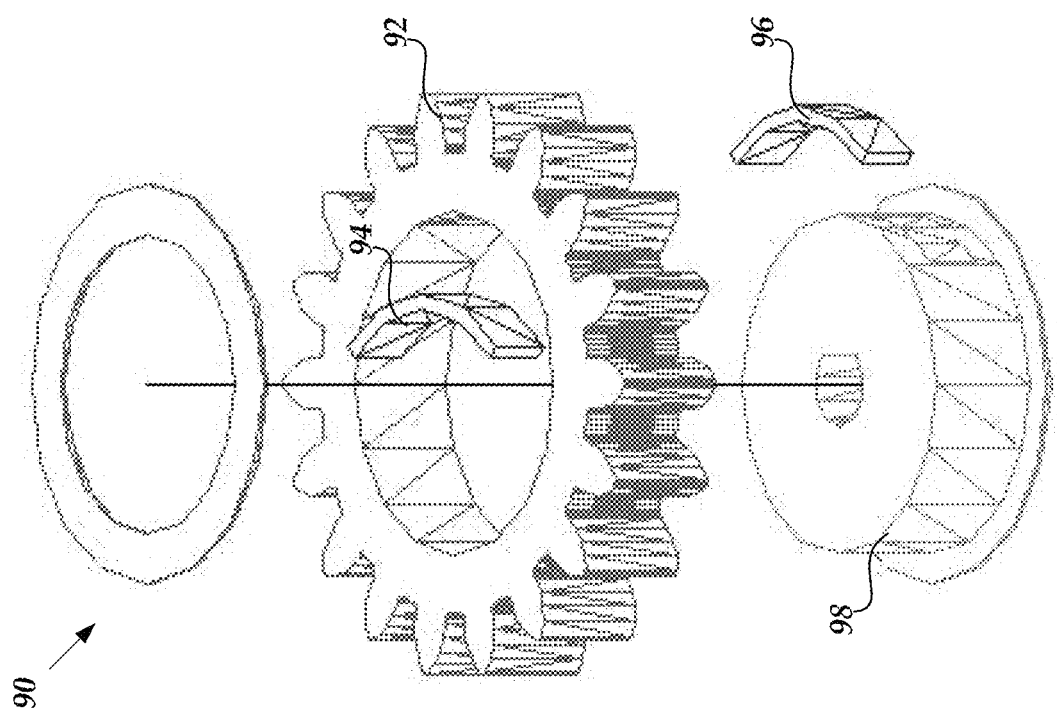
FIG. 7C is an exploded view of a cylindrical safety slip mechanism which may be utilized in a slide-glide panel privacy system, in accordance with another embodiment.

FIG. 7C is an exploded view of a cylindrical safety slip mechanism 90 which may be utilized in the system, in accordance with another embodiment. The cylindrical safety slip mechanism 90 may include an upper housing 92, a lower housing 98, and opposing magnets 94 and 96. In accordance with an embodiment, the magnets 94 and 96 have opposing polarities (i.e., positive and negative). It should be understood that the cylindrical safety slip mechanism 90 may function as a magnetic decoupler in which the opposing magnets 94 and 96 attract each other inside of the upper and lower housings 92 and 98. It should be appreciated that the cylindrical safety slip mechanism 90 may be utilized to decouple opening or closing of the balusters of a deck railing (such as when a person inadvertently slips their extremities between the balusters) such that the movement of the balusters would stop thereby avoiding the pinching of the person's extremities between the balusters.

FIG. 8 is a perspective view of lateral reinforced inserts 62 and 64 for balusters (e.g., a baluster 20) utilized in the system, in accordance with an embodiment. In particular, a baluster 20 may be manufactured out of composite, polyvinyl chloride ("PVC") or an extruded-type of material with hollowed-out sections or voids for receiving the lateral reinforced inserts 62 and 64. It should be understood that the lateral reinforced inserts 62 and 64 may be constructed of a metal material and may be utilized in composite and PVC balusters as well as balusters made of an extruded-type material because balusters constructed of the aforementioned materials are typically laterally weaker than alternative baluster construction materials such as wood or metal.

Figure 10:
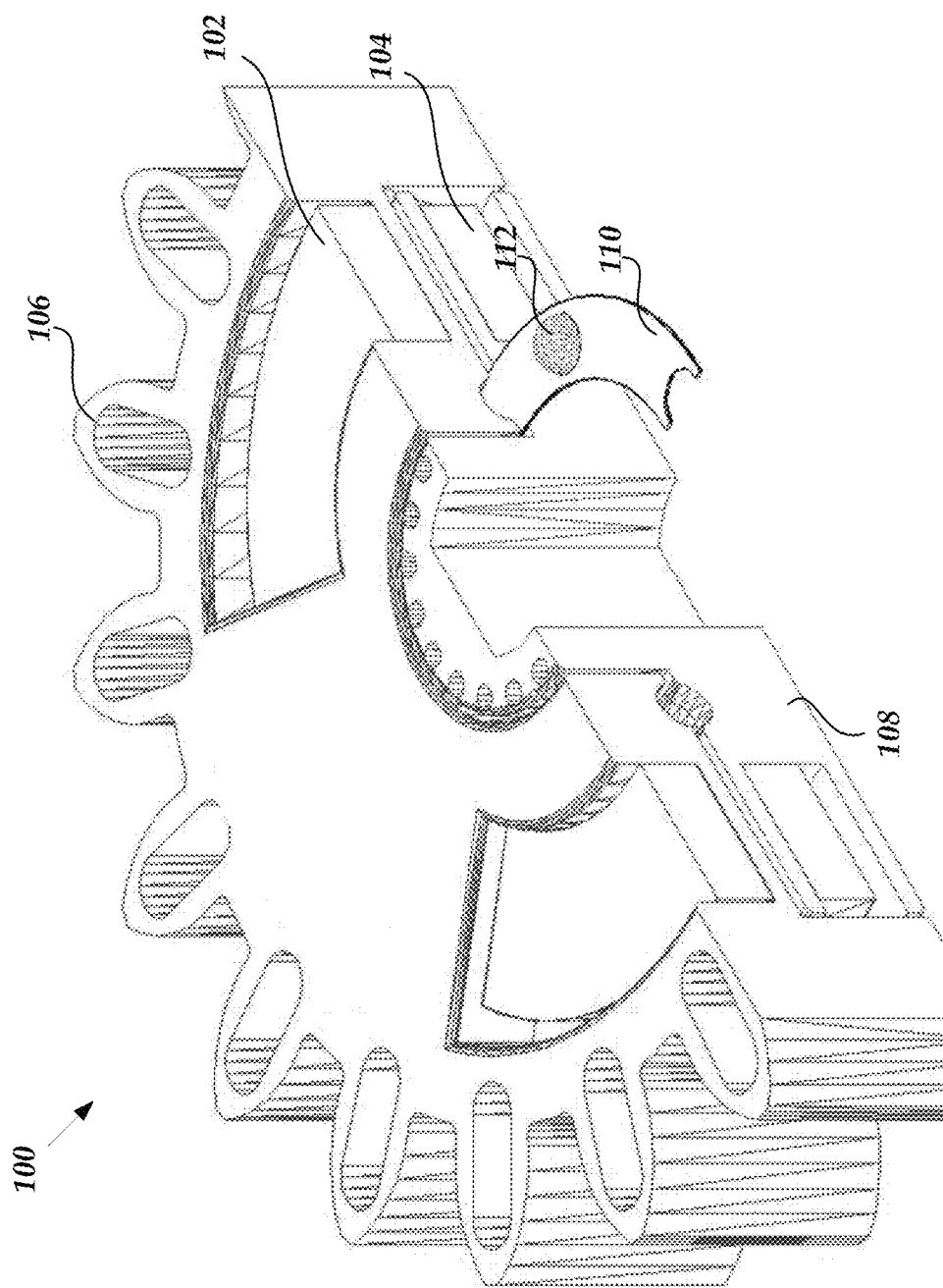
FIG. 10 is a side cross-sectional view of the cylindrical safety slip mechanism 100 of FIG. 9.

FIGS. 9-10 illustrate a further example cylindrical safety slip mechanism 100 which may be utilized in the system. In particular, FIG. 9 is an exploded view of a further example cylindrical safety slip mechanism 100, and FIG. 10 is a side cross-sectional view of the cylindrical safety slip mechanism 100 of FIG. 9. In some embodiments, the cylindrical safety slip mechanism 100 includes a first set of magnets 102, a second set of magnets 104, an upper housing 106, a lower housing 108, a bearing ring plate 110, and one or more ball bearings 112.

In this example, the first set of magnets 102 and the second set of magnets 104 have opposite polarities (i.e., positive and negative). As discussed below, the opposing magnet sets 102 and 104 attract each other inside of the upper and lower housings 106 and 108, and thus operate the safety slip mechanism 100 as a magnetic decoupler, which decouples opening or closing of the balusters of a deck railing (such as when a person inadvertently slips their extremities between the balusters) such that the movement of the balusters would stop thereby avoiding the pinching of the person's extremities between the balusters.

The upper housing 106 is configured to receive, and mount, the first set of magnets 102 on a top surface 114 of the upper housing 106. In some embodiments, the upper housing 106 includes recesses 116 configured to receive the first set of magnets 102. The upper housing 106 has a bottom surface that is opposite to the top surface of the upper housing 106. The bottom surface is configured to engage the lower housing 108, as shown in FIG. 10. In some embodiments, the upper housing 106 includes a threaded portion 117 configured to engage a control mechanism, such as the control screw 16, of the deck system. In some embodiments, the upper housing 106 is made from non-magnetic materials.

The lower housing 108 is configured to receive, and mount, the second set of magnets 104 on a side surface 118 of the lower housing. In some embodiments, the lower housing 108 includes pockets 120 configured to receive the second set of magnets 104. In some embodiments, the lower housing 108 includes a driving portion 122 configured to engage a drive shaft of a motor so that the safety slip mechanism 110 is operated by the motor. In some embodiments, the lower housing 108 is made from non-magnetic materials.

The bearing ring plate 110 is engaged between the upper housing 106 and the lower housing 108 and operates to allow a smooth rotation of the upper housing 106 relative to the lower housing 108. In some embodiments, the bearing ring plate 110 includes ball support holes 124 configured to rotatably support the ball bearings 112.

The ball bearings 112 are sized to sit on the ball support holes 124 and rotatably engaged between the upper housing 106 and the lower housing 108. The ball bearings 112 operate to roll as the upper housing 106 rotates relative to the lower housing 108.

In some embodiments, the cylindrical safety slip mechanisms 50, 90 and 100 are used as the control screw 16 of FIGS. 5 and 6. In other embodiments, the safety slip mechanisms 50, 90 and 100 are utilized in a drive train assembly 140, as shown in FIG. 11.

Figure 11:
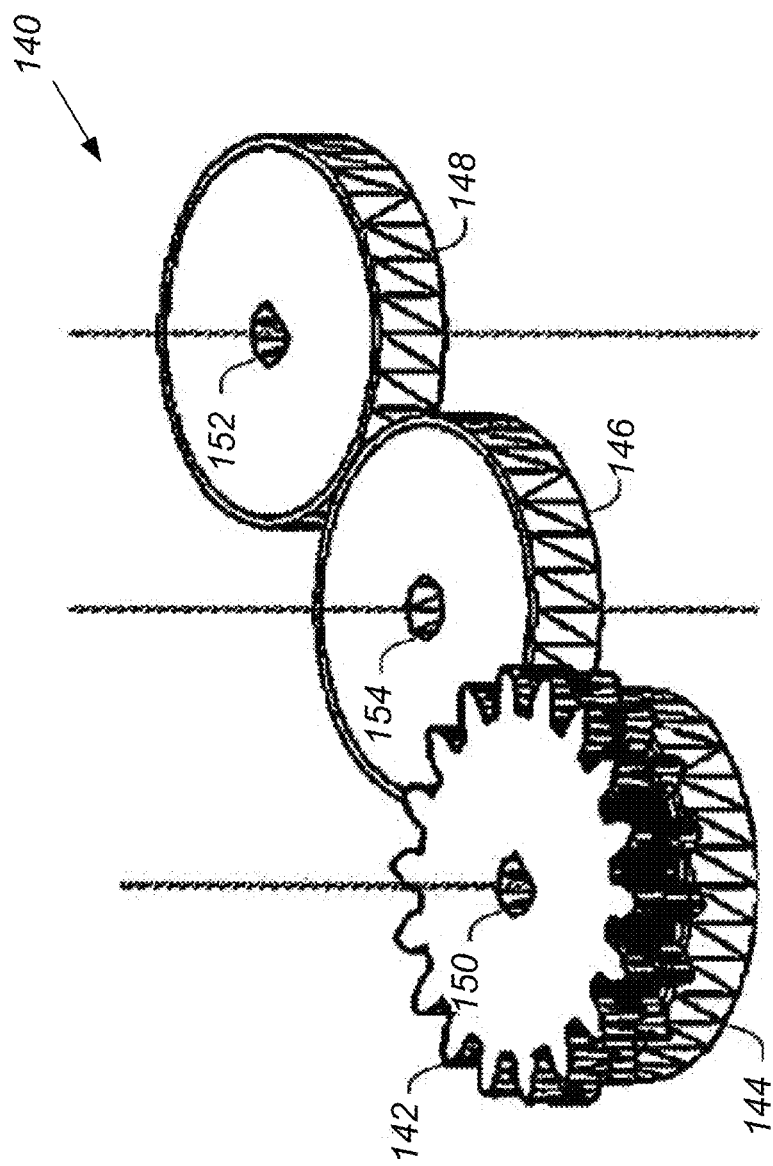
FIG. 11 illustrates an example drive train assembly utilizing the cylindrical safety slip mechanism of FIG. 7B, 7C, or 9.

FIG. 11 illustrates an example drive train assembly 140, utilizing the cylindrical safety slip mechanism 50, 90 or 100. In some embodiments, the cylindrical safety slip mechanism 50, 90 or 100 operates as a drive gear 142 located on the one end of the drive train system 140 and is coupled with a drive wheel 144. This drive wheel 144 is in contact with an idler wheel 146, which is in contact with a drive wheel 148. The drive train system 140 is made of as many drive and idler wheels as there are individually driven balusters. In some embodiments, the drive wheels 144 and 148 include respective oblong holes 150 and 152 to prevent slipping of the wheels on the drive shaft, whereas the idler wheel 146 includes a round hole 154 for free rotation on its shaft.

In some embodiments, the drive train assembly 140 does not include a drive gear 142, but only includes drive wheels 144, 146 and 148. The engaging surfaces of the drive wheels 144, 146 and 148 are made of rubber, which allows the drive wheels 144, 146 and 184 to engage one another by fractional force. These rubber drive wheels 144, 146 and 148 are advantageous in absorbing the shrink or expansion of the drive wheels due to variations in temperature, for example.

In other embodiments, various configurations of a drive train assembly are utilized as necessary. Examples of such configurations of a drive train assembly are disclosed in U.S. Pat. No. 7,673,853, titled Fencing Section with Adjustable Fencing Members, issued on Mar. 9, 2010, the disclosure of which is hereby incorporated by reference in its entirety.

As shown in FIGS. 1A and 2A, the opposing balusters 20 and 28 of the panel sections 5 and 6 are arranged to form a first side 42 and a second side 44. In some embodiments, the first side 42 faces the interior of the deck, and the second side 44 faces the exterior of the deck. By selective operation of the opposing balusters 20 and 28 as described above, the interior of the deck can, or cannot, be seen from the second side 44 (the outside) through the gaps or spaces between the balusters 20 and 28, or the outside of the deck can, or cannot, be seen from the first side 42 (the inside) of the deck through the gaps or spaces formed between the balusters 20 and 28.

Furthermore, as described above, the opposing balusters are separate from other components, such as frame or barrier sections, and operatively connected to the other components. The opposing balusters are not integrated parts of the frame or barrier sections.

Referring back to FIG. 8, the lateral reinforced inserts are configured to reinforce balusters with relatively longer height or length. For example, the lateral reinforced inserts are inserted into the hollowed-out sections or voids of the balusters that have a length or height of more than about two feet, which is required by some building safety codes or regulations.

Referring again to FIGS. 5 and 6, the baluster actuator system 35 includes a rotating gear mechanism 200 and a guide mechanism 202. In this example, the system 35 is configured to position the movable balusters 20 relative to the stationary balusters 28 at any location from the open position as shown in FIG. 5 and the closed position as shown in FIG. 6, or vice versa. The system 35 can move the movable balusters 20 against the stationary balusters 28 between the open position and the closed position.

In some embodiments, in the open position, the movable balusters 20 are arranged behind the stationary balusters 28 to at least partially open the spaces or gaps defined between the stationary balusters 28 in the deck railing. In the illustrated example, the gaps between the stationary balusters 28 are completely open in the open position. In some embodiments, in the open position, the movable balusters 20 are arranged in parallel with the stationary balusters 28. In other embodiments, the movable balusters 20 are positioned at an angle relative to the stationary balusters 28.

In the closed position, as shown in FIG. 6, the movable balusters 20 are received in the gaps between the stationary balusters 28 to close the gaps in the deck railing. In the closed position, the movable balusters 20 are arranged in line with the stationary balusters 28 so that the movable balusters 20 and the stationary balusters 28 are positioned in the same imaginary plane. In other embodiments, in the closed position, the movable balusters 20 are moved relative to the stationary balusters 28 to partially close the gaps between the stationary balusters 28. In this configuration, the movable balusters 20 can be positioned in a different plane from the stationary balusters 28. For example, the movable balusters 20 can be arranged behind the stationary balusters 28, either in parallel or at an angle.

The rotating gear mechanism 200 includes a rotating gear 16, which can be operated manually or automatically. For example, the mechanism 200 includes a handle that is coupled to the rotating gear 16 to rotate the gear 16, or a controller that a user can interact to control a motor or actuator for operating the rotating gear. Such a motor or actuator can be of various types, such as electronic, hydraulic, or pneumatic devices.

The rotating gear mechanism 16 can replace the control screw 16 as shown in FIGS. 4A and 4B. In other embodiments, the rotating gear mechanism 16 can be used together with the control screw in FIGS. 4A and 4B.

The rotating gear 16 is configured and arranged to engage the movable baluster 20 either directly or via a baluster rail 208 as described below. For example, the rotating gear 16 engages the lateral surface of the baluster rail 208 that is attached to the movable baluster 20, and the baluster rail 208 slides against the rotating gear as the rotating gear rotates.

The guide mechanism 202 is configured to guide the movable balusters 20 relative to the stationary balusters 28 between the open and closed positions. In the illustrated example, the guide mechanism 202 includes one or more first guide rails 204 and one or more second guide rails 206.

The first guide rail 204 is configured to provide a rail against which the movable baluster 20 slides to position between the open position and the closed position. In some examples, the first guide rail 204 at least partially extends in parallel with the corresponding stationary baluster 28 behind the stationary baluster 28, and is angled adjacent an end of the stationary baluster 28 so as to extend toward the gap between the adjacent stationary balusters 28. Such a straight portion of the first guide rail 204 is configured to allow the movable baluster 20 to be placed behind the stationary baluster 28 in parallel. Such an angled portion of the first guide rail 204 is configured to allow the movable baluster 20 to be placed in the gap between the stationary balusters 28.

The second guide rail 206 is configured to move the movable baluster 20 to a third position in which the movable baluster 20 is arranged behind the baluster gap (i.e., the gap between the stationary balusters 28) and spaced apart from the baluster gap so that the movable baluster 20 is arranged in a different plane from the stationary balusters 28. In the third position, the baluster gap can be hid by the movable baluster 20 when viewed from the front or back of the deck. In the third position, the baluster gap can be laterally open so that wind or water can flow therebetween. In some embodiments, the second guide rail 206 has a straight portion and an angled portion. The straight portion of the second guide rail 206 can be positioned behind, and spaced apart from, the baluster gap, and the angled portion extends from the straight portion at an angle toward the baluster gap.

In some embodiments, the first guide rails 204 and the second guide rails 206 are arranged at the inner surfaces of the top rails 12 and 22 and the bottom rails 13 and 23 of the deck railing 10. In other embodiments, the first guide rails 204 and the second guide rails 206 are provided either at the top rails 12 and 22 or at the bottom rails 13 and 23.

Referring still to FIGS. 5 and 6, the guide mechanism 202 can also include a baluster rail 208 that is arranged at the top and/or bottom of the movable baluster 20. The baluster rail 208 is configured to slide against the first guide rail 204 and/or the second guide rail 206 as the movable baluster 20 moves among the open position, the closed position, and the third position. In some embodiments, the guide mechanism 202 includes a rail bracket 210 attached to the movable baluster 20 to fix the baluster rail 208 to the movable baluster 20. In other embodiments, the baluster rail 208 can be directly attached to the movable baluster 20.

The baluster rail 208 has a straight portion that extends in parallel with the corresponding stationary baluster, and an angled portion that extends from an end of the straight portion at an angle away from the stationary baluster 28. The straight portion of the baluster rail 208 is configured to slide against the straight portion of the first guide rail 204, and the angled portion of the baluster rail 208 is configured to slide against the angled portion of the first guide rail 204. In some embodiments, when the angled portion of the baluster rail 208 is abut with the angled portion of the first guide rail 204, the movable baluster 20 is positioned in the baluster gap to be in line with the stationary baluster 28. The straight portion of the baluster rail 208 can also contact the straight portion of the second guide rail 206 and slide thereagainst.

In some embodiments, the movable balusters 20 can be interconnected via a baluster coupling device 212 extending between the movable balusters 20 so that at least some of the movable balusters 20 are movable together with a single rotating gear 16. Using the coupling device 212, the rotating gear 16 does not have to be provided to each of the movable balusters 20. Examples of the coupling device include a string, wire, and metal or plastic bar.

In this document, it has been primarily described that the movable balusters slide substantially in parallel with the stationary balusters between the closed position and the open position. In other embodiments, however, at least some of the balusters are configured to rotate about their own axes to move between the closed position (in which the deck system is at least partially closed) and the open position (in which the deck system is at least partially open). Examples of this configuration are disclosed in U.S. Pat. No. 7,673,853, titled Fencing Section with Adjustable Fencing Members, issued on Mar. 9, 2010, the disclosure of which is hereby incorporated by reference in its entirety.

As described herein, when the deck system is in its open position, the deck system can permit wind to blow through gaps defined by the balusters, thereby preventing the deck system from falling or collapsing over wind blow. The user of the deck system can operate the balusters to the open position as described herein to avoid such falling or collapsing over strong wind. Alternatively, the deck system includes a sensor system to detect a predetermined speed of wind blow and automatically move the balusters to the open position.

Referring to FIGS. 12-26, another example baluster 300 is described that can be used with the deck of the present disclosure.

Figure 12:
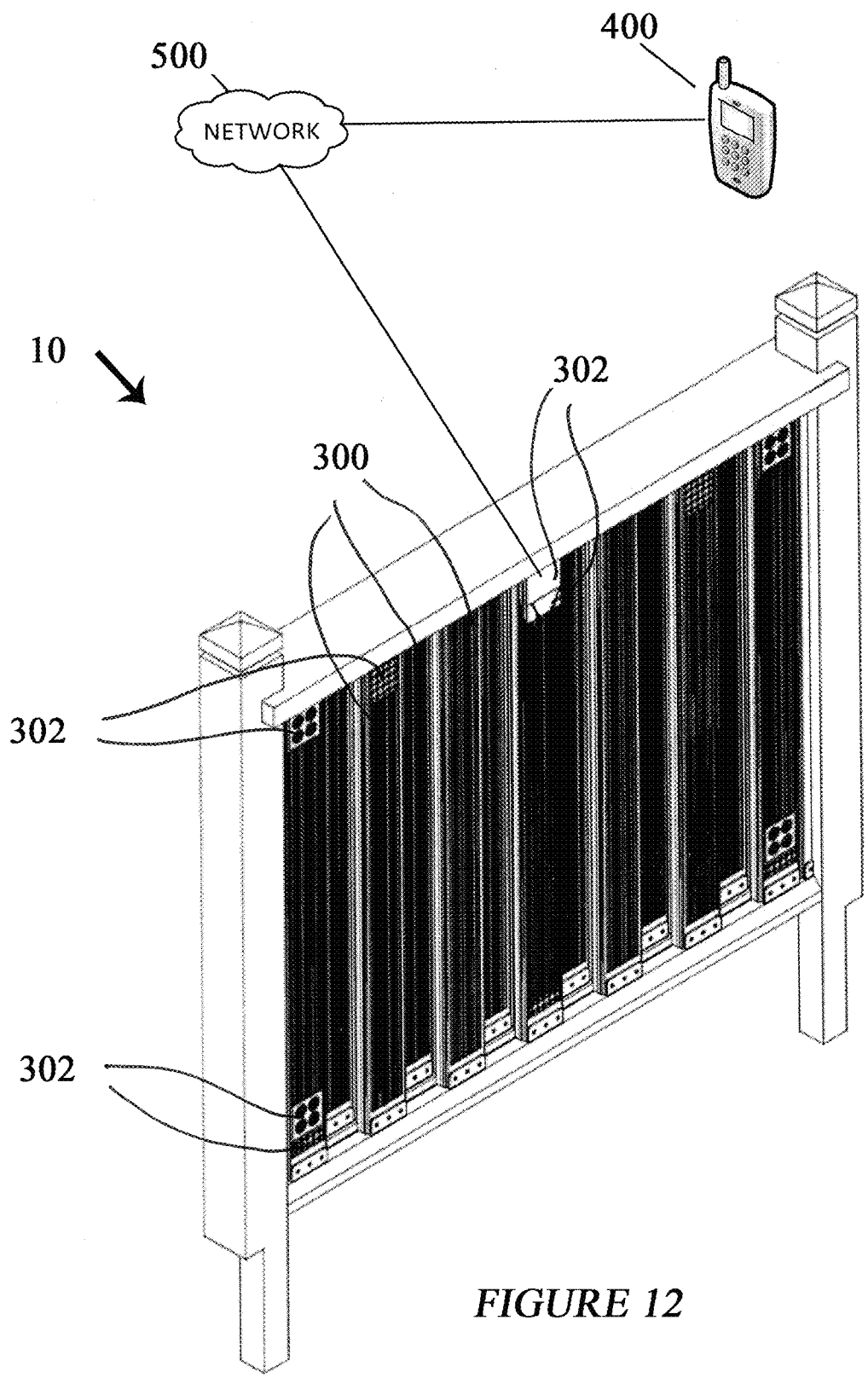
FIG. 12 illustrates a deck system with a plurality of multi-functional balusters.

FIG. 12 illustrates a deck system 10 with a plurality of multi-functional balusters 300. The baluster 300 is configured to perform various functions with one or more functional modules 302. As described below, the baluster 300 is configured to selectively secure one or more functional modules 302. The functional modules 302 are configured to provide different functionality and insertable to the face of the baluster 300.

Figure 13:
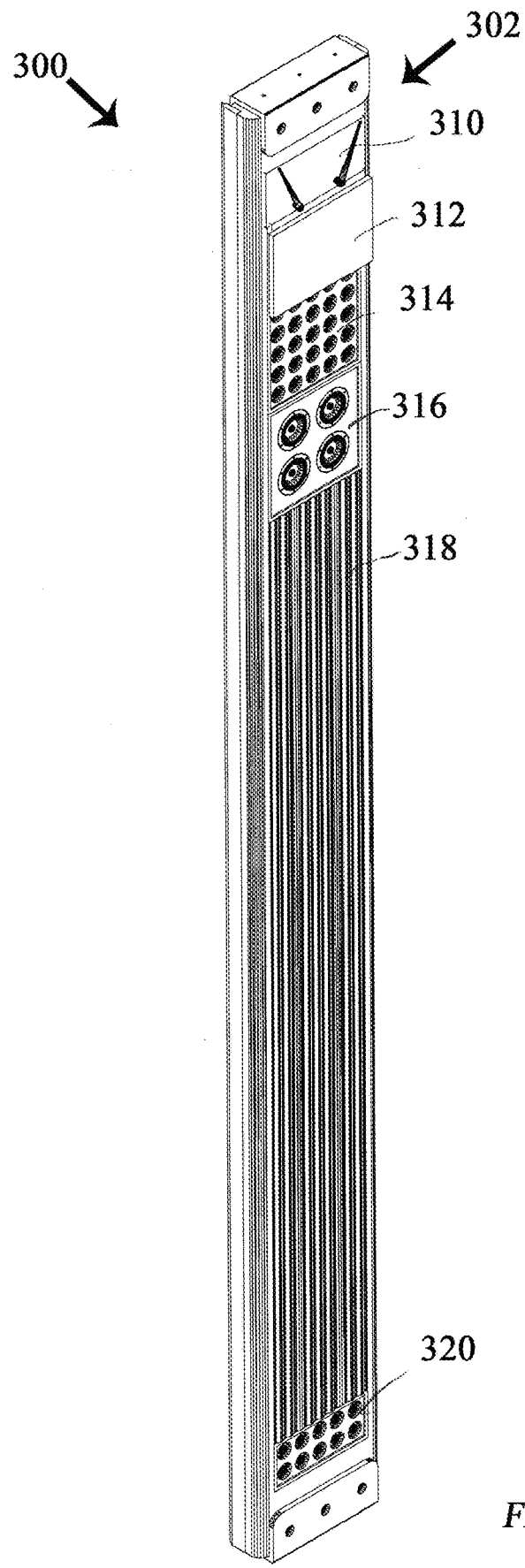
FIG. 13 illustrates an example of the multi-functional baluster.

FIG. 13 illustrates an example of the multi-functional baluster 300. The multi-functional baluster 300 includes a plurality of functional modules 302, such as a communication module 310, a battery pack module 312, a first light module 314, a speaker module 316, a solar panel module 318, and a second light module 320.

Figure 14:
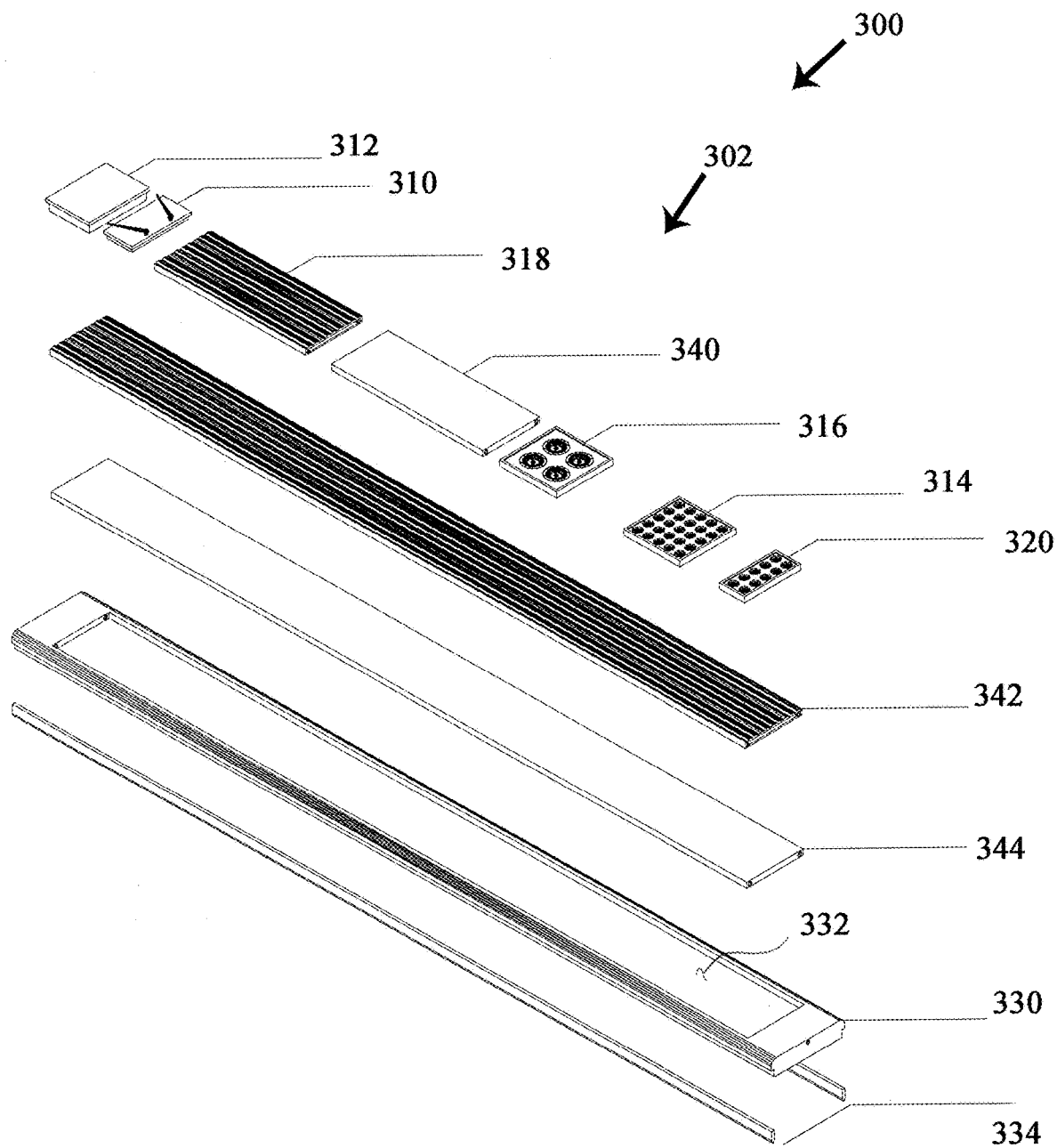
FIG. 14 is an exploded view of the multi-functional baluster of FIG. 13.

FIG. 14 is an exploded view of the multi-functional baluster 300 of FIG. 13. The baluster 300 has a baluster panel unit 330 configured to provide a module insert 332. In some embodiments, the module insert 332 is a recess or groove that extends at least partially along the length of the panel unit 330 and is sized to engage one or more of the modules 302. In some embodiments, the module insert 332 is sized to receive the modules 302 in a single column along the longitudinal direction of the baluster. In other embodiments, the module insert 332 is dimensioned to receive the modules 302 in two or more columns along the longitudinal direction of the baluster.

As already shown in FIGS. 2A, 3A, 4A, 4B, 5, and 6, the baluster 300 includes edge seals 334 arranged at the lateral edges of the panel unit 330 along the longitudinal direction thereof. The edge seals 334 are configured to close any gap or spacing when the movable baluster is positioned between the adjacent stationary balusters or inserted into the gap between the adjacent stationary balusters. In this configuration, the edge seals 334 can contact the lateral edges of the adjacent stationary balusters when the movable baluster is arranged next to, or adjacent to, the stationary balusters.

As shown in FIG. 14, the functional modules 302 can be inserted into the module insert 332 of the panel unit 330 in various orders. A user can choose whatever order a plurality of functional modules 302 is arranged in the panel unit 330. When the modules 302 do not fill the entire module insert 332, one or more panel filler insert modules 340 can be provided and inserted into the remaining space of the module insert 332 so that the panel filler insert modules 340 fill any gaps between the functional modules 302 and the functional modules 302 are disposed securely in the panel unit 330.

The modules 302 can be engaged with the panel unit 330 in various ways. In some embodiments, the modules 302 can be snap-fitted into the module insert 332 of the panel unit 330. In other embodiments, the modules 302 are received into the module insert 332 and fastened to the panel unit 330. In yet other embodiments, the modules 302 are attached to the panel unit 330 using adhesives. In yet other embodiments, the modules 302 are interference-fitted into the module insert 332 of the panel unit 330.

In some embodiments, the functional modules 302 can be used with other balusters without the module insert 332. In other embodiments, the functional modules 302 can be retrofit to typical balusters in various ways. The functional modules 302 can be attached to such balusters in many different ways, such as using fasteners, adhesives, snap-fitting, interference-fitting, welding, or any suitable means.

In some embodiments, a full length solar panel module 342 can be used with the baluster 300 without other functional modules 302. The full length solar panel module 342 is sized to fill in the entire module insert 332 of the panel unit 330.

In some embodiments, a full length panel filler insert module 344 can be used when no functional module 302 is used with the baluster 300. The full length panel filler insert module 334 is sized to fill in the entire module insert 332 of the panel unit 330.

In some embodiments, the baluster 300 is provided or sold with the full length panel filler insert module 344. A user can use the baluster 300 with the full length panel filler insert module 344 if the user does not need any functionality from functional modules 302. The functional modules 302 can be provided separately from the baluster 300 and obtained (i.e., purchased) individually. When one or more functional modules 302 are to be used with the baluster, the user can choose positions at which the modules 302 are arranged, and cut the full length panel filler insert module 344 to desired length and/or pieces. Such shorted panel filler insert modules 344 (just as the filler insert modules 340) can be inserted into the module insert 332, along with the functional modules 302, at desired locations.

Figure 15:
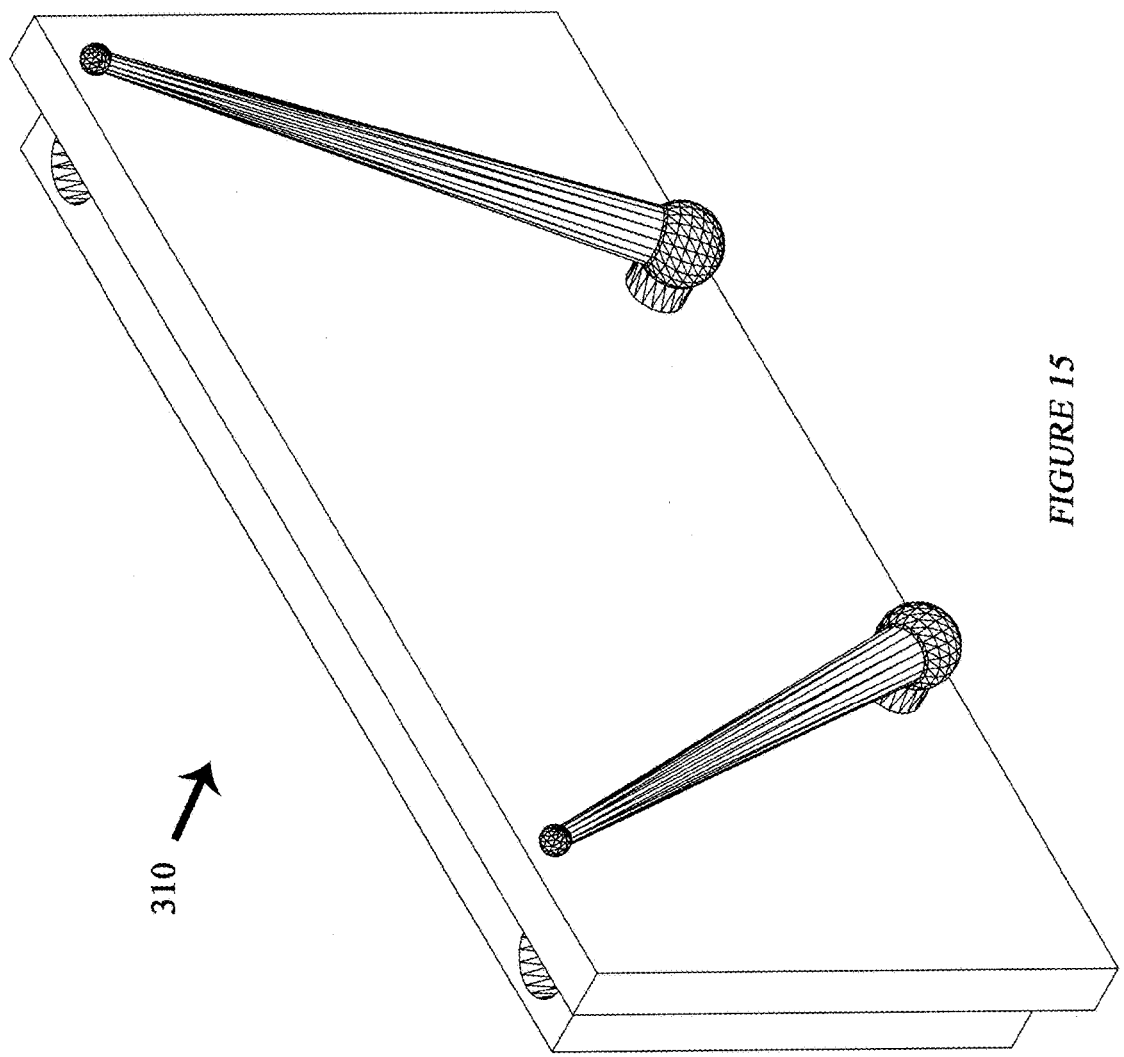
FIG. 15 schematically illustrates an example communication module.
Figure 32:
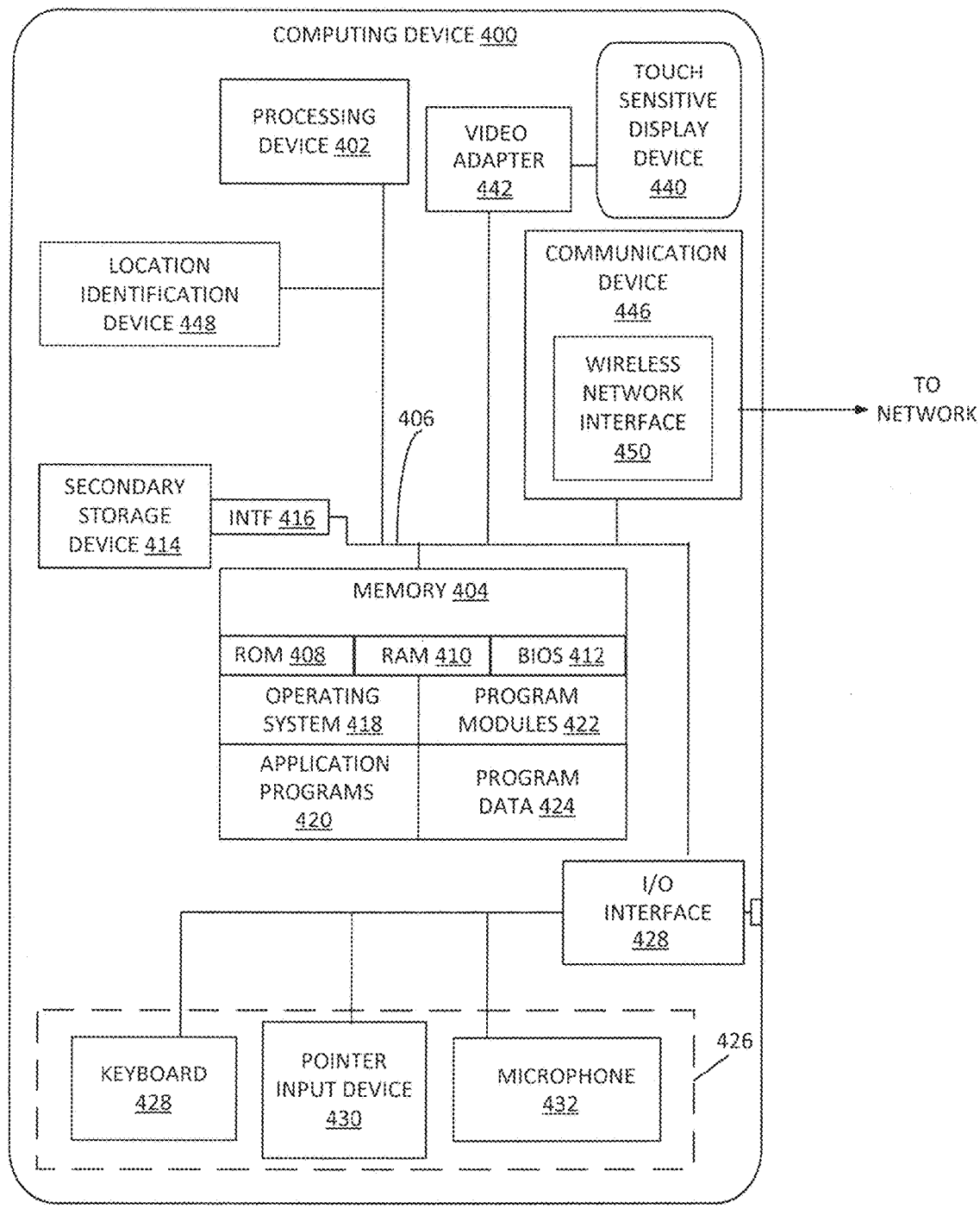
FIG. 32 illustrates an exemplary architecture of a computing device which can be used to implement various devices in the present disclosure.

As illustrated in FIG. 15, the communication module 310 is configured to data communicate with a computing device 400 via a data communication network 500. The computing device can be used by a user of the deck system 10. An example of the computing device is illustrated in FIG. 32. The communication module 310 can have an antenna extending from the module.

The data communication network 500 communicates digital data between one or more computing devices or circuits, such as between the deck system 10 (e.g., the communication module 310) and the computing device 400. Examples of the network 500 include a local area network and a wide area network, such as the Internet. In some embodiments, the network 500 includes a wireless communication system, a wired communication system, or a combination of wireless and wired communication systems. A wired communication system can transmit data using electrical or optical signals in various possible embodiments. Wireless communication systems typically transmit signals via electromagnetic waves, such as in the form of optical signals or radio frequency (RF) signals. A wireless communication system typically includes an optical or RF transmitter for transmitting optical or RF signals, and an optical or RF receiver for receiving optical or RF signals. Examples of wireless communication systems include Wi-Fi communication devices (such as utilizing wireless routers or wireless access points), cellular communication devices (such as utilizing one or more cellular base stations), and other wireless communication devices.

Figure 16:
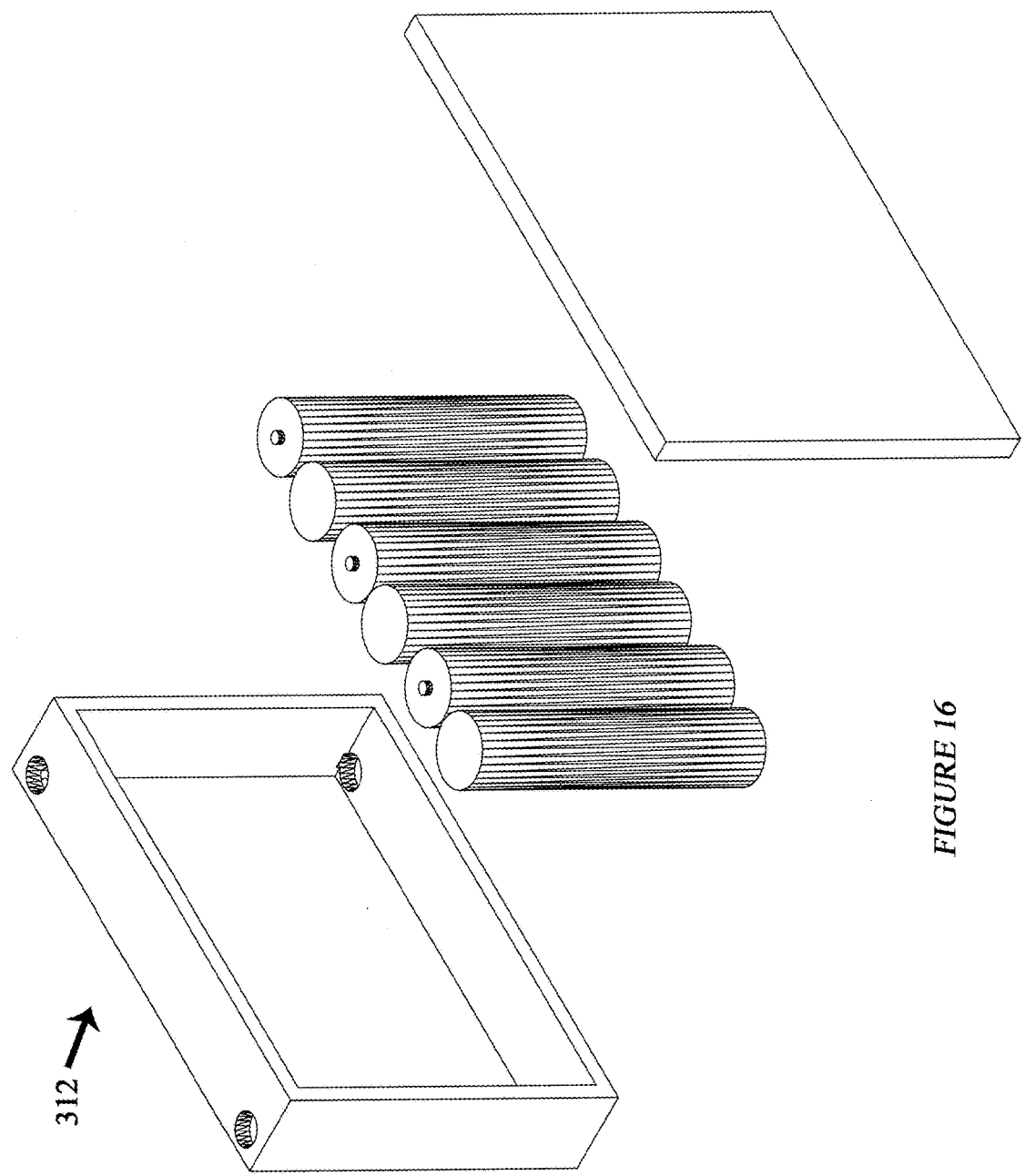
FIG. 16 schematically illustrates an example battery pack module.

As illustrated in FIG. 16, the battery pack module 312 includes one or more batteries, which can be used to provide power to the other modules 302 in the baluster. In other examples, the battery pack module 312 can be connected to and provide power to other electronics in the deck system 10. In some embodiments, the batteries in the module 312 are rechargeable and recharged with power collected at the solar panel module.

Figure 17:
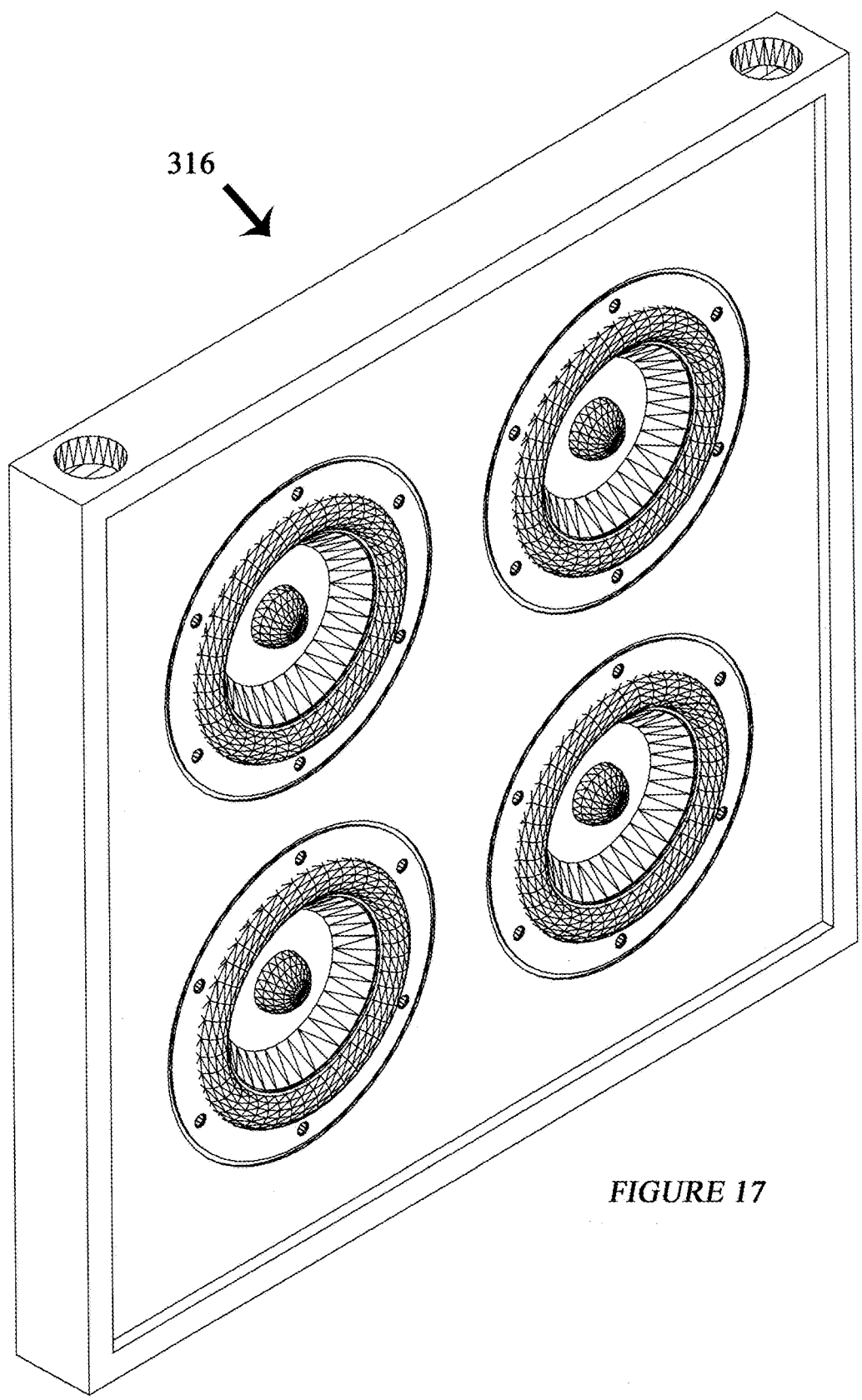
FIG. 17 schematically illustrates an example speaker module.

As illustrated in FIG. 17, the speaker module 316 is configured to provide audio or sound. In some examples, a mobile computing device can be connected to the speaker module either directly or via the communication module 310, and thus sound can be provided through the speaker module 316. For example, a user of a mobile computing device can play back media content items via the speaker module 316. As illustrated in FIG. 18, the speaker module 316 has different sizes with different number of speaker elements, such as a first speaker module 316A having 25 speaker elements and a second speaker module 316B with 10 speaker elements.

The first light module 314 and the second light module 320 are configured to provide light from the baluster. The light modules can have various sizes, such as the larger size of the first light module 314 than the second light module 320. The light modules include one or more light elements, such as LED elements.

The solar panel module 318 and the full length solar panel module 342 are configured to absorb the sun's rays as a source of energy for generating electricity. The generated electricity can be used in the other functional modules 302 in the baluster or other electrical components in the deck system or in other places. In addition or alternatively, the generated energy can be stored in the battery module.

In some examples, the solar panel modules include a photovoltaic (PV) module that is a packaged, connected assembly of solar cells. Solar Photovoltaic panels constitute the solar array of a photovoltaic system that generates and supplies solar electricity in various applications. Each module can be rated by its DC output power under standard test conditions.

Figure 19:
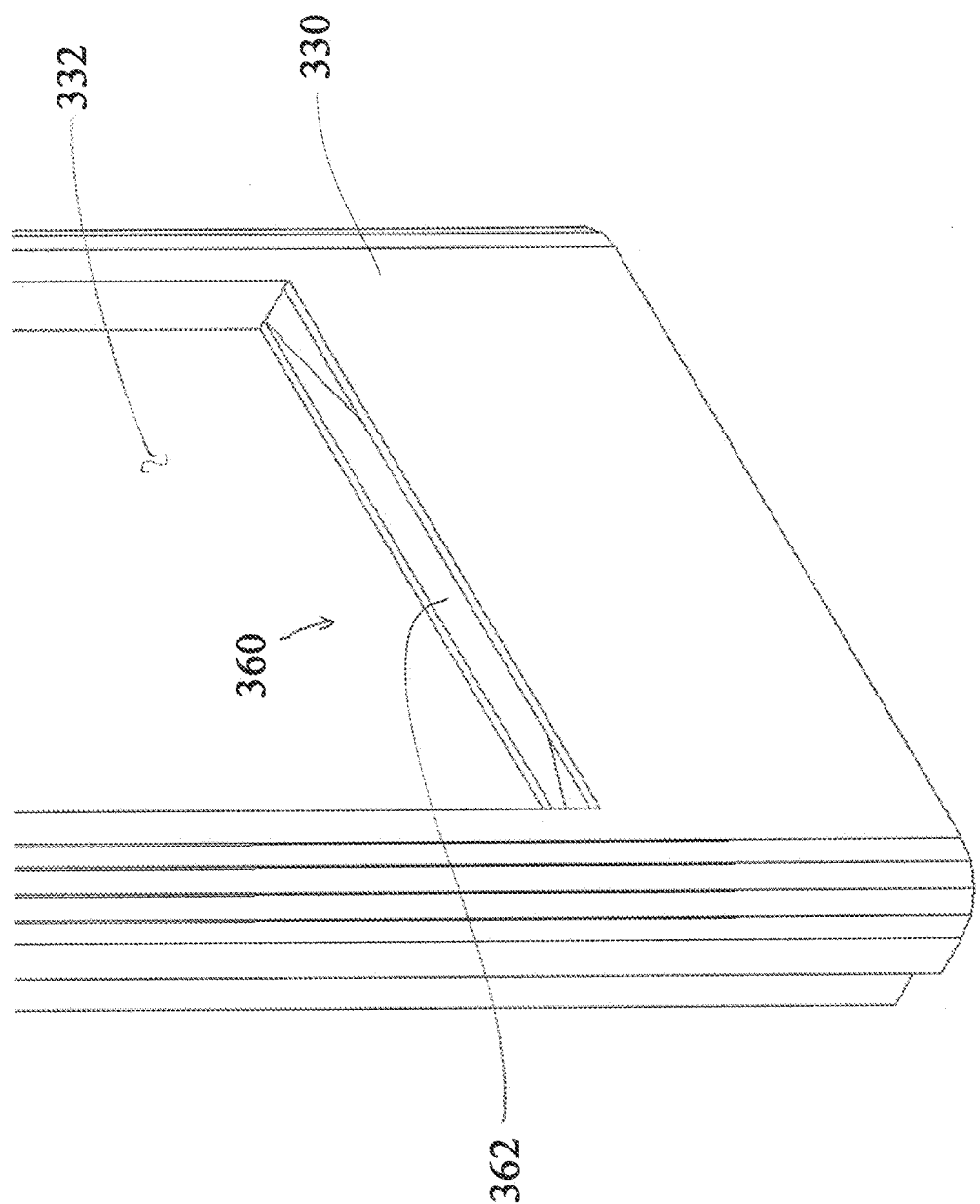
FIG. 19 illustrates an example drain element of the baluster.

FIG. 19 illustrates an example drain element 360 of the baluster 300. As illustrated, the lower end face of the module insert 332 of the panel unit 330 has a groove or recess 362 that works as a drain element 360 configured to collect moisture that is built up within the module insert 332 or other portions of the baluster 300, and in some embodiments to redirect the moisture out of the baluster.

Figure 20:
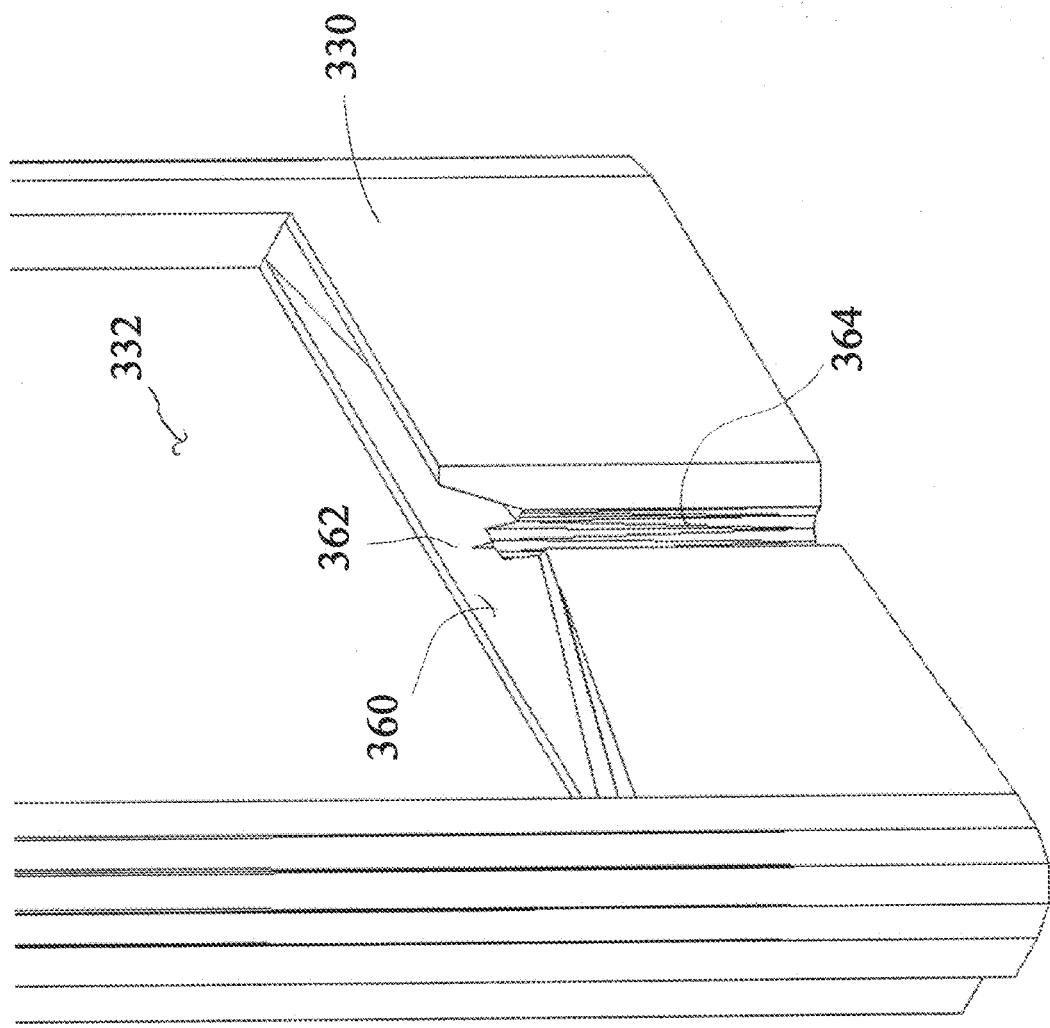
FIG. 20 illustrates another example drain element of the baluster.

FIG. 20 illustrates another example drain element 360 of the baluster 300. Similarly to the drain element 360 of FIG. 19, the drain element 360 includes a groove or recess 362 at the lower end (e.g., on a lower interior surface) of the module insert 332. The drain element 360 further includes a discharge channel 364 downwardly extending from the recess 362. The discharge channel 364 is configured to discharge water built up in the recess 362.

Figure 21:
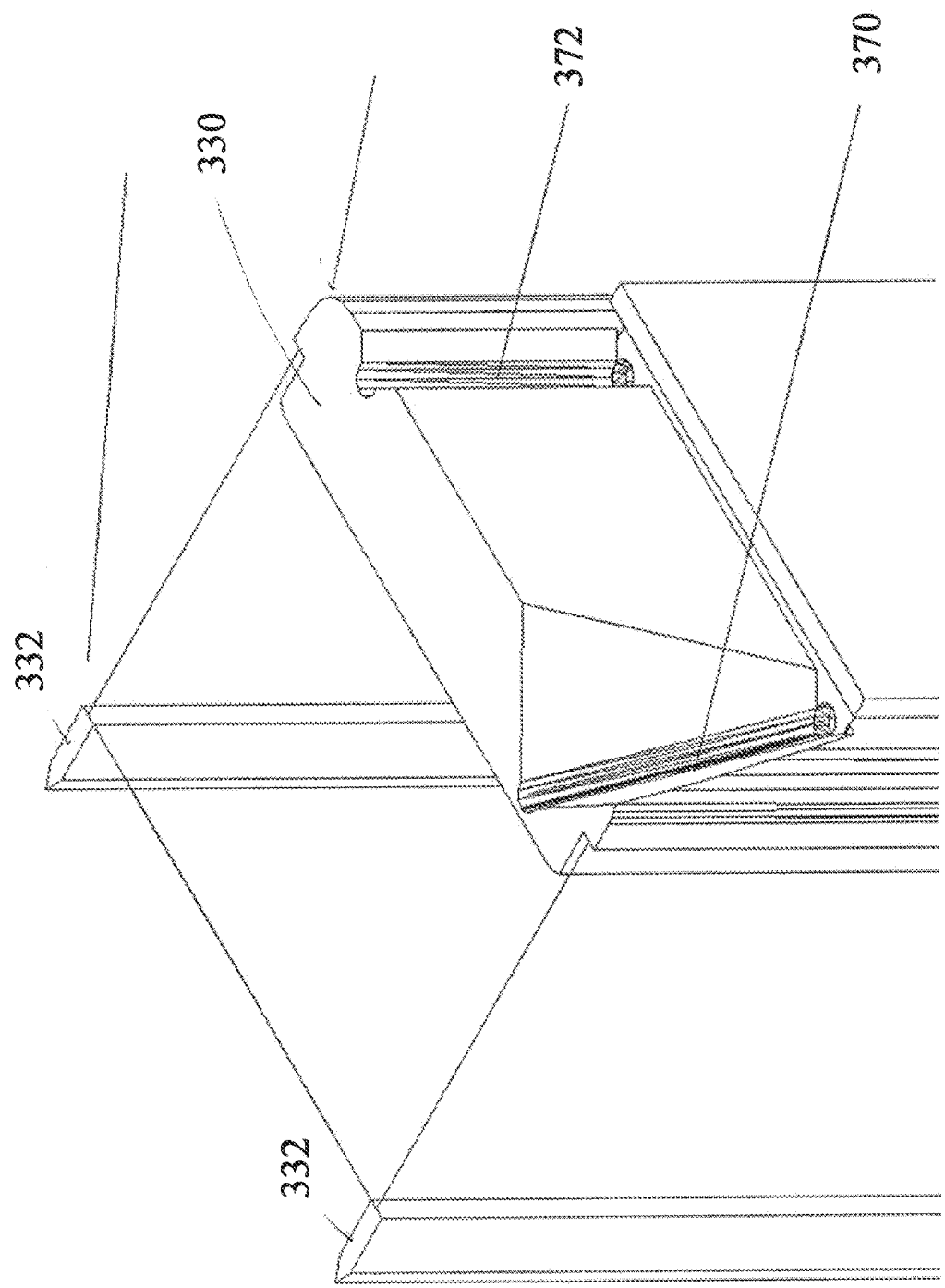
FIG. 21 illustrates a top portion of the panel unit.
Figure 22:
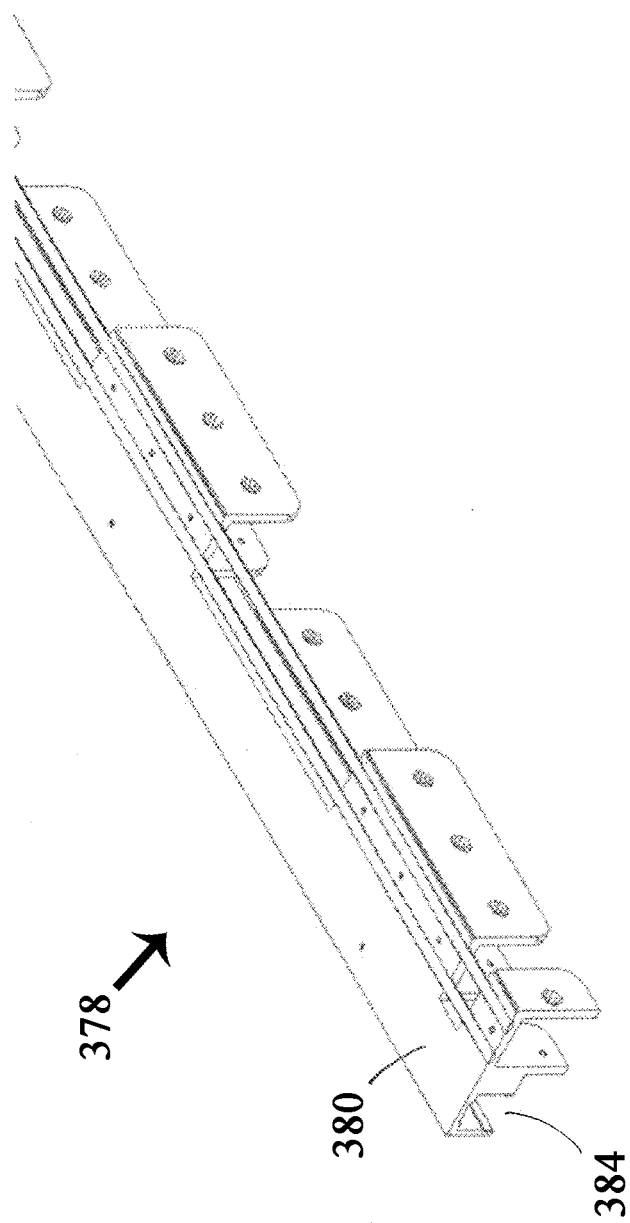
FIGS. 22-26 illustrate an example wiring scheme of balusters.
Figure 23:
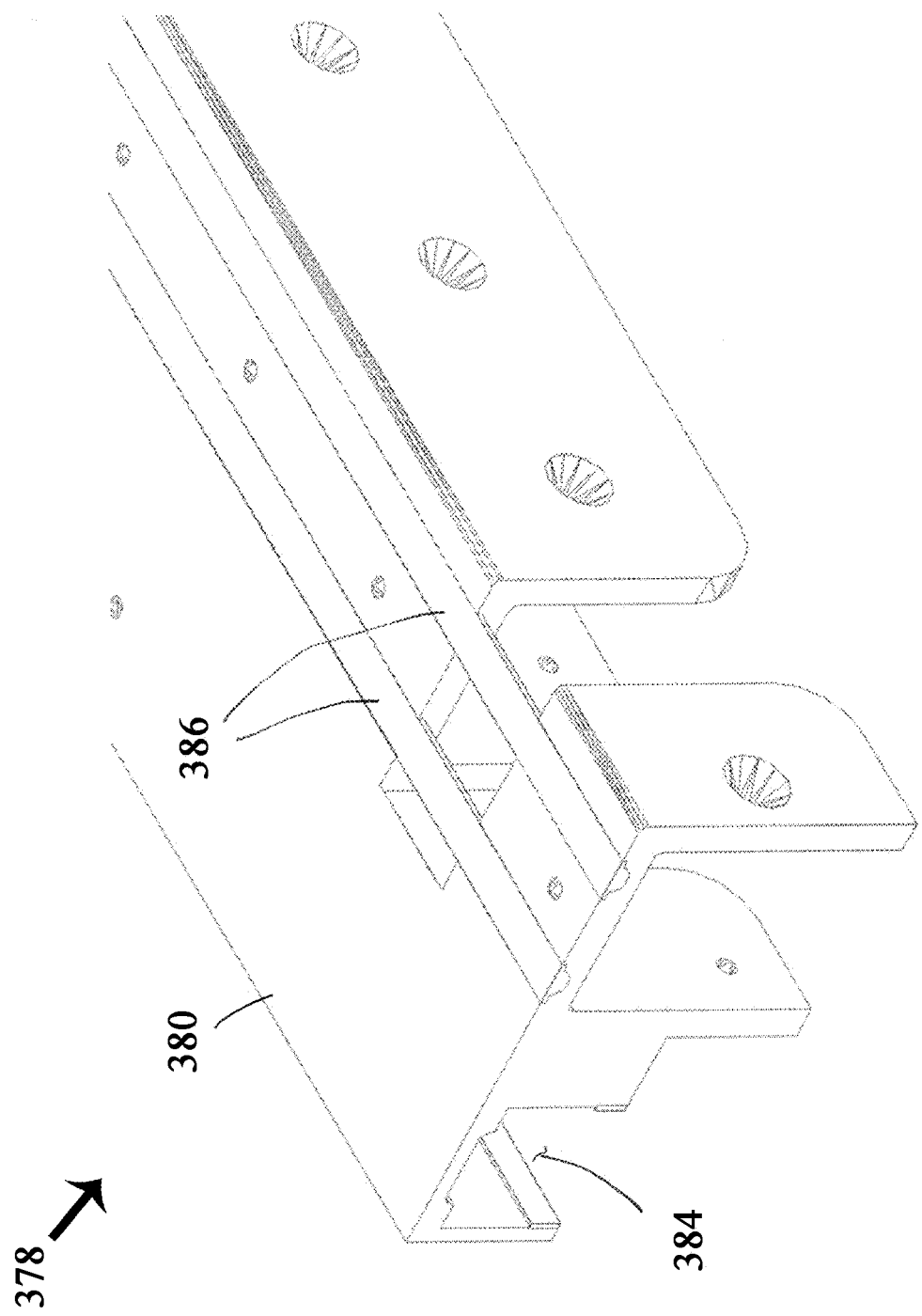
Figure 24:
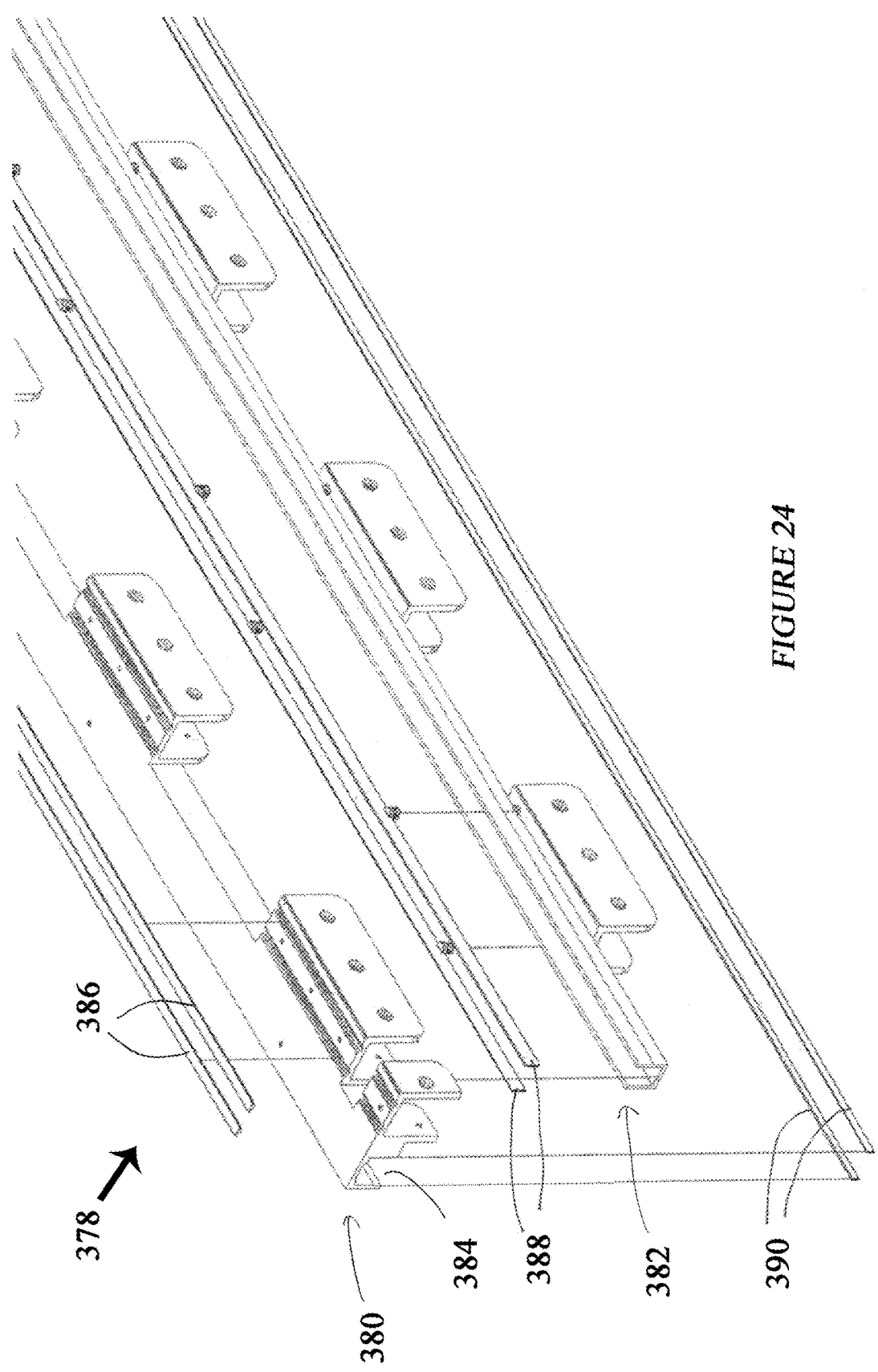
Figure 25:
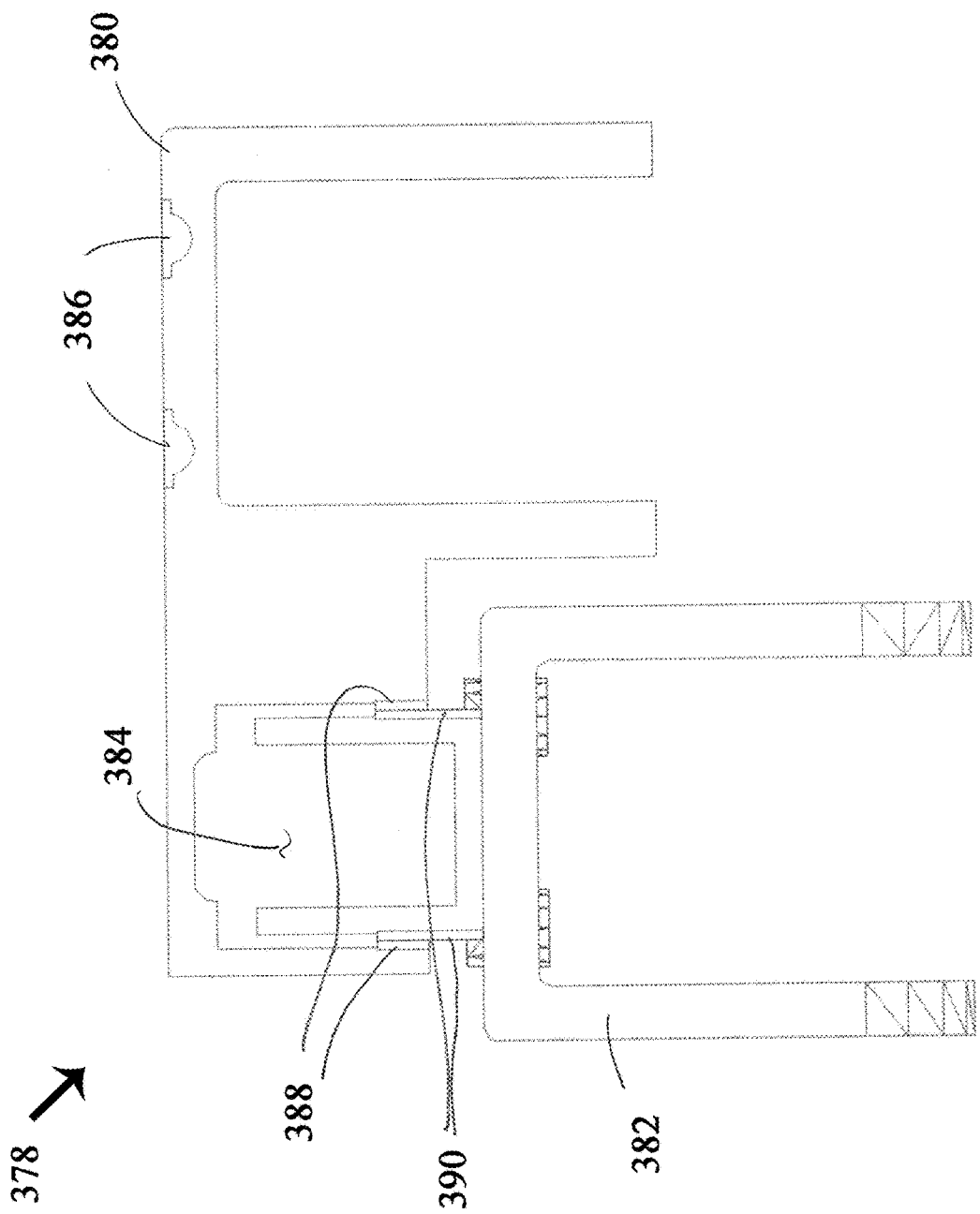
Figure 26:
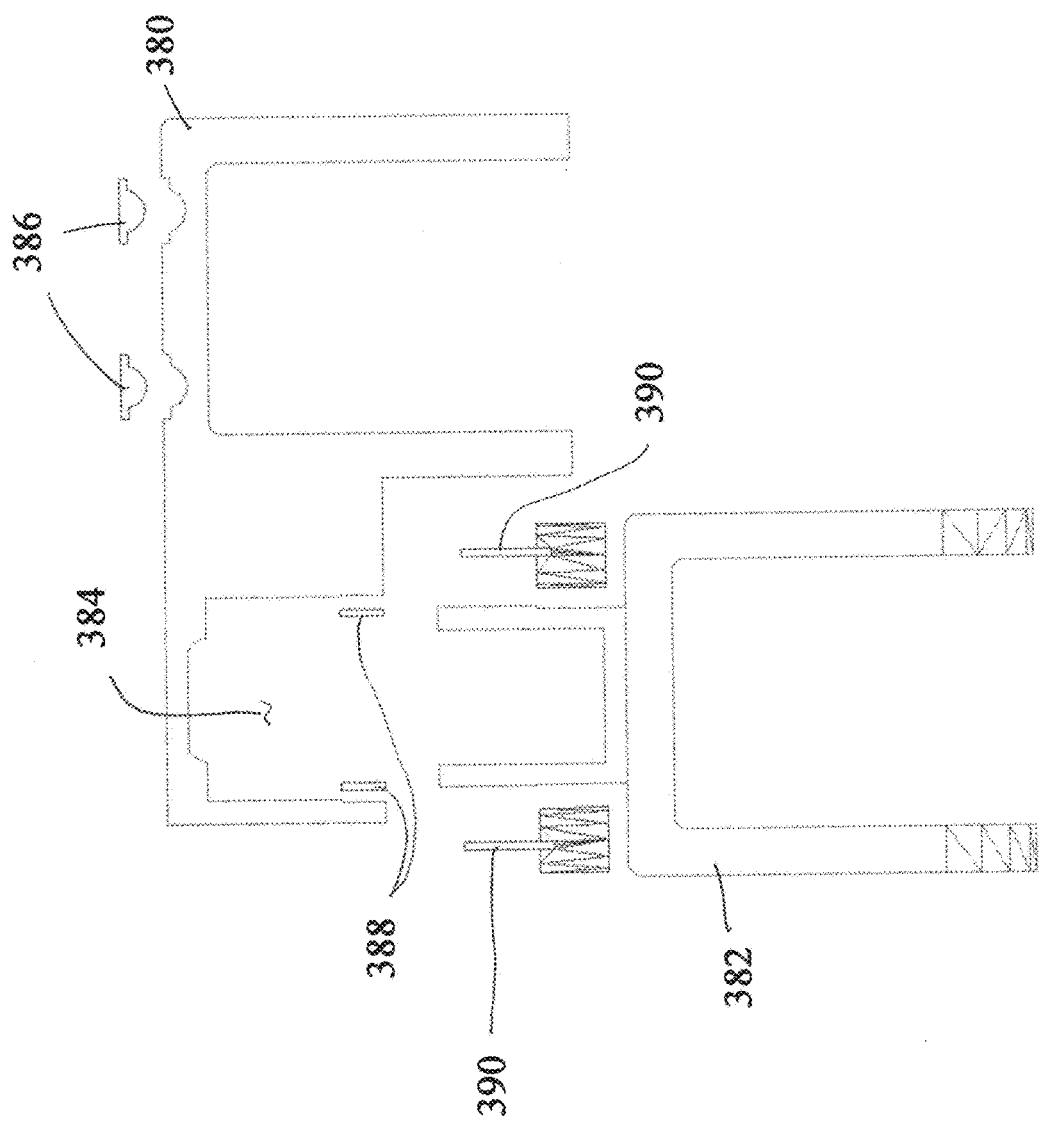

FIG. 21 illustrates a cutout view of a top portion of the panel unit 330. The top portion of the panel unit 330 includes a first wire hole 370 and a second wire hole 372. Wires can extend through the first and second wire holes 370 and 372. The wires passing through the wire holes 370 and 371 can extend through wire holes 374 of the functional modules 302 to connect electronics housed in the functional modules 302.

Referring to FIGS. 22-26, an example wiring scheme of the baluster is described. As illustrated, in some embodiments, the upper railing assembly includes a first bracket 380 attached to the stationary balusters, and a second bracket 382 attached to the movable balusters. The second bracket 382 is configured to be at least partially received with a channel 384 defined in the first bracket and slide along the channel 384. The first bracket 380 includes a pair of first conductor lines 386 (e.g., for positive and negative) extending along the first bracket 380 and connected to wires routing to the stationary balusters. The first conductor lines 386 are connected to power source, so that power is supplied through the pair of first conductor lines to the stationary balusters (and through the wires extending to the stationary balusters).

The channel 384 of the first bracket 380 is provided with a pair of collector lines 388 (or rods, rails, bars, or rings) that are disposed along the channel 384. The second bracket 382 includes a pair of second conductor lines 390 (e.g., for positive and negative) extending along the second bracket 382 and connected to wires routing to the movable balusters.

The second conductor lines 390 are fixed to the second bracket 382 and slidably contact the collector lines 388 when the second bracket 382 is partially received within the channel 384 of the first bracket 380. The collector lines 388 are connected to power source. With this configuration, the movable balusters can continuously receive power through the collector lines 388 and the second conductor lines 390 regardless of the position of the movable balusters relative to the stationary balusters. In other embodiments, the lower railing assembly can be configured as described above, instead of, or together with, the upper railing assembly.

In some embodiments, the balusters with solar panels are configured to rotate about their axes to track the sun. The deck system includes a solar tracker configured to orient the solar panels in the balusters toward the sun. The solar tracker can be of various types known in the art. With the solar tracker, the deck system can include rotatable balusters 500, as illustrated in FIG. 27.

Referring to FIGS. 27-31, an example of the deck system 10 with rotatable balusters 500 is described. Further, an example wiring scheme of the deck system 10 with rotatable balusters 500 is described.

Figure 27:
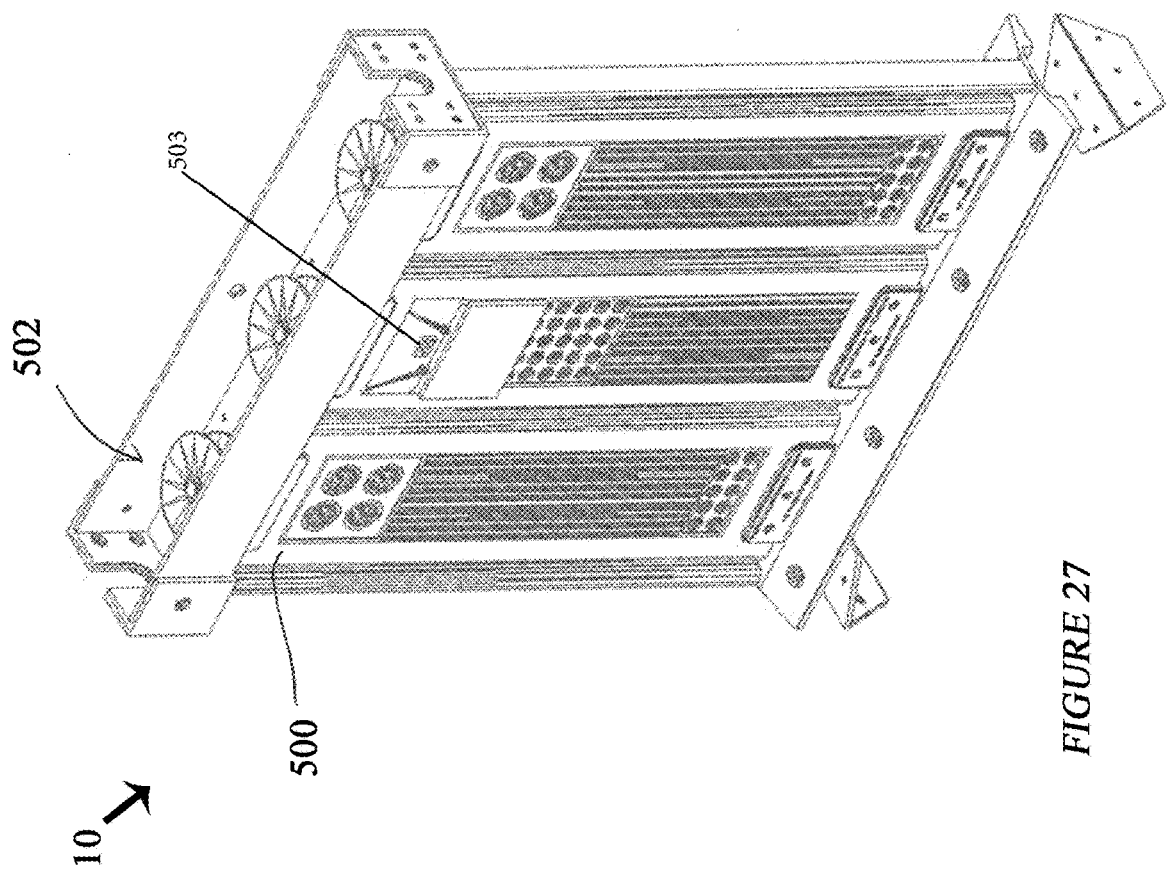
FIG. 27 illustrates a deck system with rotating balusters.
Figure 28:
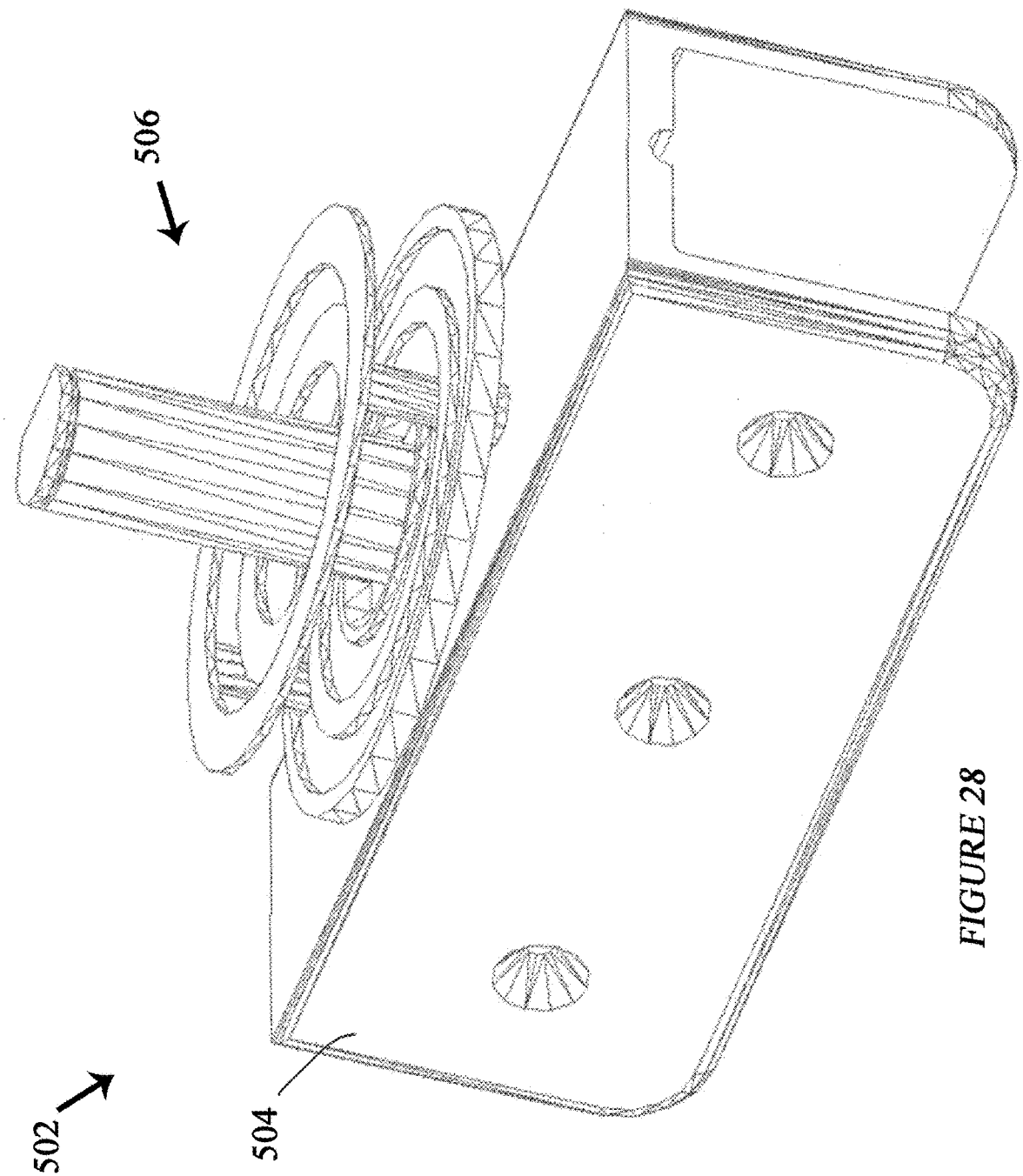
FIGS. 28-31 illustrate an example wiring scheme of the rotating baluster of FIG. 27.
Figure 29:
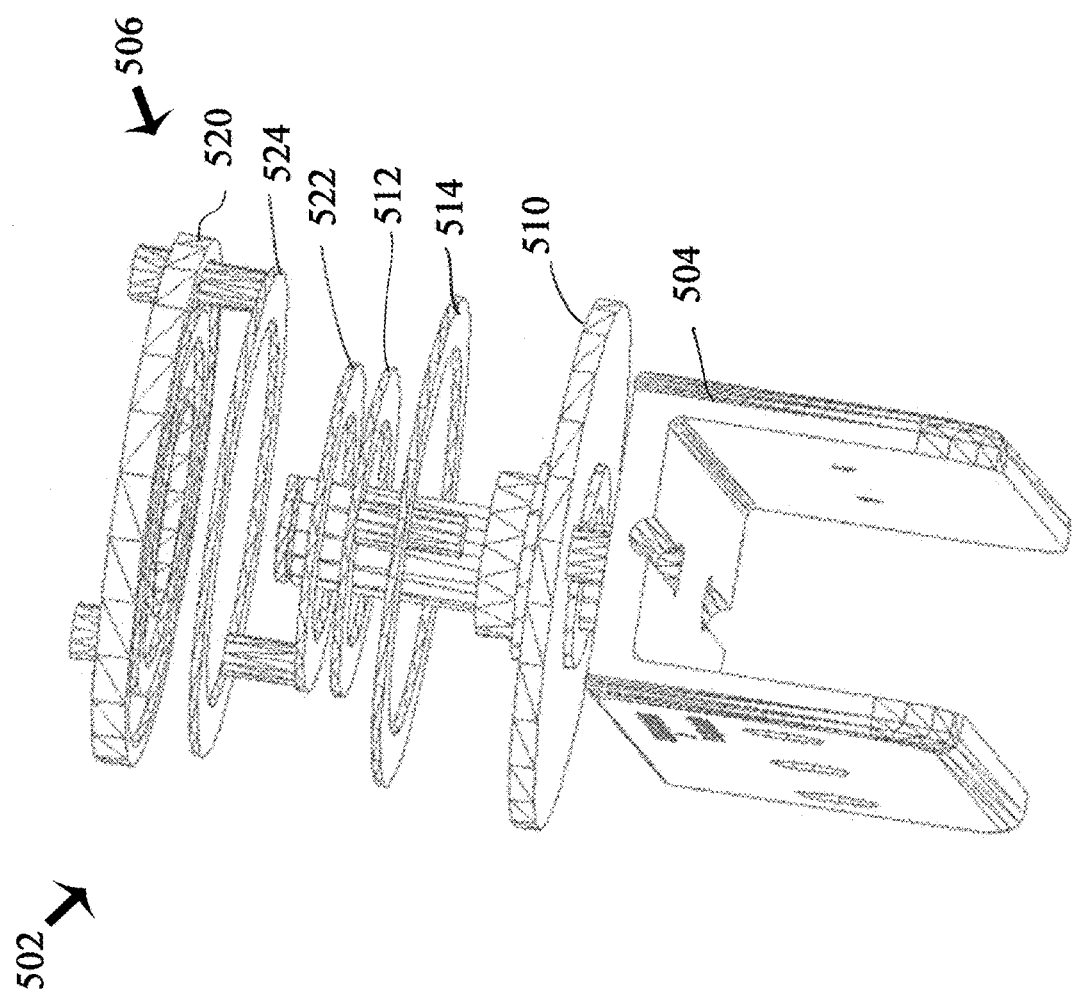
Figure 30:
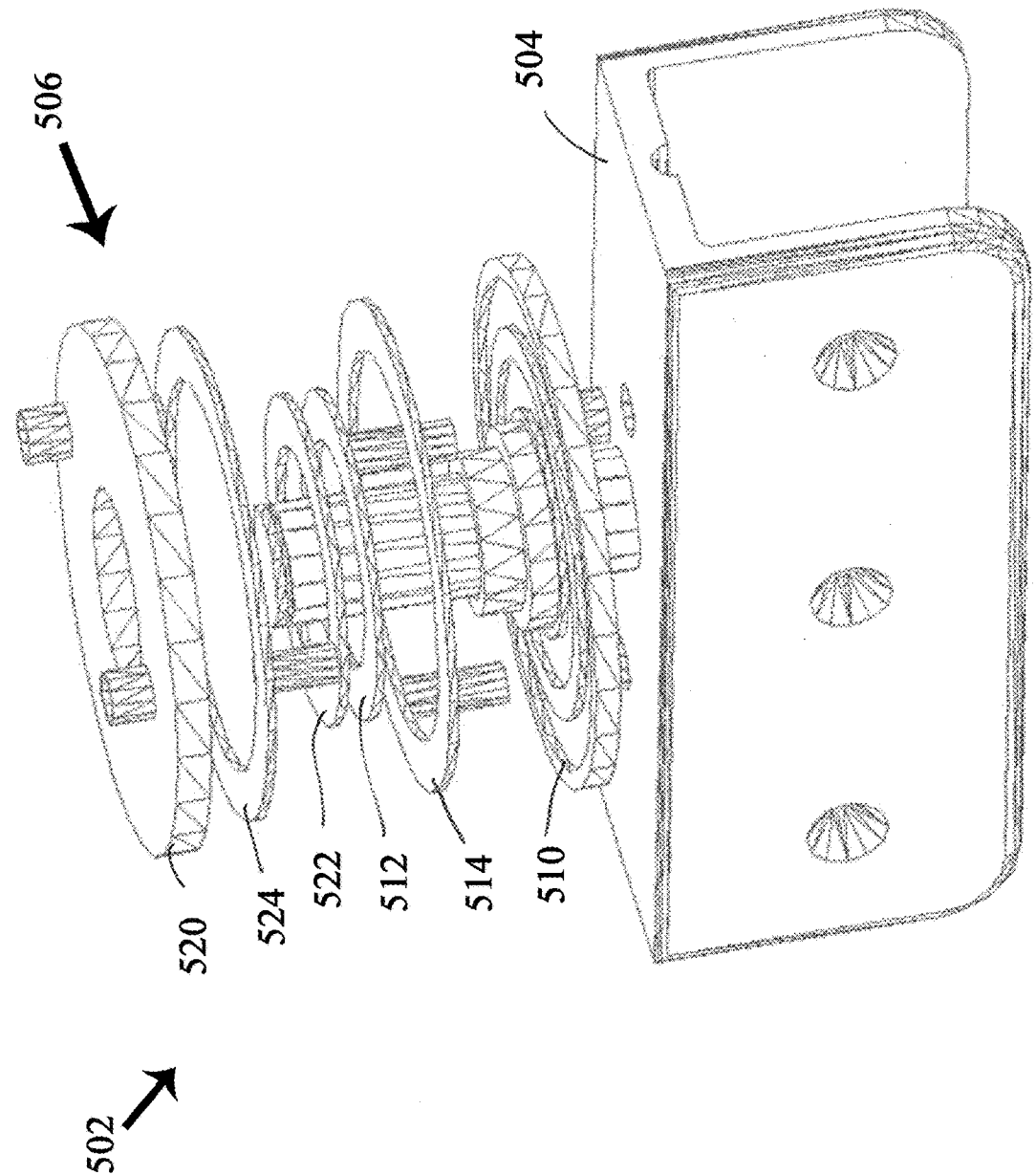
Figure 31:
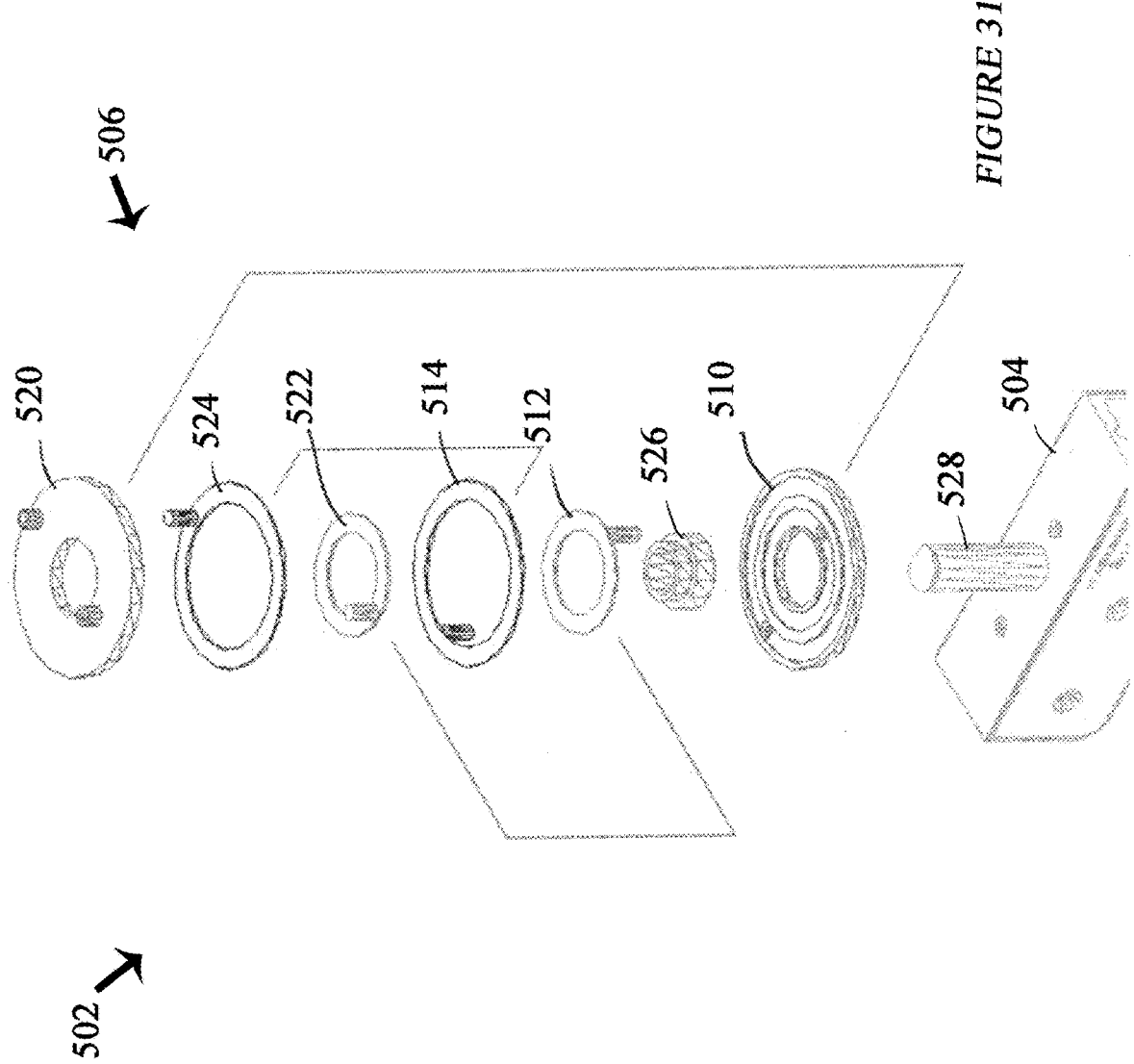

In FIG. 27, the balusters 500 are rotatable about their axes within the deck system 10. In some embodiments, actuation devices 502 are provided and used to rotate the balusters 500. The actuation devices 502 can be engaged with the upper railing system (FIG. 27) and/or the lower railing system. Examples of such rotatable balusters are disclosed in U.S. Pat. No. 7,673,853, titled Fencing Section with Adjustable Fencing Members, issued on Mar. 9, 2010, the disclosure of which is hereby incorporated by reference in its entirety.

In some embodiments, at least one of the function modules (as described above) includes a cable connection port 503, such as a USB port, HDMI port, and other types of connections. The cable connection port 503 can be used for various functions, such as charging and data communications.

In FIGS. 28-31, a baluster bracket 504 with a wiring system 506 is illustrated. In some embodiments, the baluster bracket 504 is fixed on the top of each baluster 500. The wiring system 506 includes a bracket side conductor housing 510 configured to secure a pair of first conductor rings 512 and 514 (e.g., for positive and negative). In some embodiments, the bracket side conductor housing 510 has a center hole for receiving a shaft 528 of the bracket 504 so that the bracket side conductor housing 510 rotates together with the baluster bracket 504. In some embodiments, the bracket side conductor housing 510 is fixed to the shaft 528 of the baluster bracket 504 via a locking element 526.

Corresponding to the bracket side conductor housing 510, a railing side housing 520 is provided, which is fixed to the railing and configured to secure a pair of second conductor rings 522 and 524 (e.g., for positive and negative). As the baluster rotates relative to the railing, the bracket side conductor housing 510 rotates relative to the railing side housing 520 while the first conductor rings 512 and 514 remain in contact with the second conductor rings 522 and 524. The second conductor rings 522 and 524 are connected to power source. Therefore, power can be supplied to the baluster through the second conductor rings 522 and 524 and the first conductor rings 512 and 514 regardless of the rotational position of the baluster relative to the railing.

FIG. 32 illustrates an exemplary architecture of a computing device which can be used to implement various devices in the present disclosure. For example, the computing device that can communicate with the baluster 300 can be implemented as the computing device as illustrated in FIG. 32. The computing device 400 illustrated in FIG. 32 is used to execute the operating system, application programs, and software modules (including the software engines) described herein.

In some embodiments, a mobile application can run on the computing device 400 to interact with the modules 302, such as the communication module, of the baluster 300. A user can control and use the modules 302 via the mobile application running on the computing device 400.

The computing device 400 is a computing device of various types. In some embodiments, the computing device 400 is a mobile computing device. Examples of computing device 400 as a mobile computing device include a mobile device (e.g., a smart phone and a tablet computer), a wearable computer (e.g., a smartwatch and a head-mounted display), a personal digital assistant (PDA), a handheld game console, a portable media player, a ultra-mobile PC, a digital still camera, a digital video camera, and other mobile devices. In other embodiments, the computing device 400 is other computing devices, such as a desktop computer, a laptop computer, or other devices configured to process digital instructions.

The computing device 400 includes, in some embodiments, at least one processing device 402, such as a central processing unit (CPU). A variety of processing devices are available from a variety of manufacturers, for example, Intel or Advanced Micro Devices. In this example, the computing device 400 also includes a system memory 404, and a system bus 406 that couples various system components including the system memory 404 to the processing device 402. The system bus 406 is one of any number of types of bus structures including a memory bus, or memory controller; a peripheral bus; and a local bus using any of a variety of bus architectures.

The system memory 404 includes read only memory 408 and random access memory 410. A basic input/output system 412 containing the basic routines that act to transfer information within the computing device 400, such as during start up, is typically stored in the read only memory 408.

The computing device 400 also includes a secondary storage device 414 in some embodiments, such as a hard disk drive, for storing digital data. The secondary storage device 414 is connected to the system bus 406 by a secondary storage interface 416. The secondary storage devices and their associated computer readable media provide nonvolatile storage of computer readable instructions (including application programs and program modules), data structures, and other data for the computing device 400.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 414 or memory 404, including an operating system 418, one or more application programs 420, other program modules 422, and program data 424.

In some embodiments, the computing device 400 includes input devices to enable a user to provide inputs to the computing device 400. Examples of input devices 426 include a keyboard 428, a pointer input device 430, a microphone 432, and a touch sensitive display 440. Other embodiments include other input devices. The input devices are often connected to the processing device 402 through an input/output interface 438 that is coupled to the system bus 406. These input devices 426 can be connected by any number of input/output interfaces, such as a parallel port, serial port, game port, or a universal serial bus. Wireless communication between input devices and interface 438 is possible as well, and includes infrared, BLUETOOTH® wireless technology, 802.11a/b/g/n, cellular, or other radio frequency communication systems in some possible embodiments.

In this example embodiment, a touch sensitive display device 440 is also connected to the system bus 406 via an interface, such as a video adapter 442. The touch sensitive display device 440 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 440, the extended medical test apparatus 400 can include various other peripheral devices (not shown), such as speakers or a printer.

The computing device 400 further includes a communication device 446 configured to establish communication across the network. In some embodiments, when used in a local area networking environment or a wide area networking environment (such as the Internet), the computing device 400 is typically connected to the network through a network interface, such as a wireless network interface 450. Other possible embodiments use other wired and/or wireless communication devices. For example, some embodiments of the computing device 400 include an Ethernet network interface, or a modem for communicating across the network. In yet other embodiments, the communication device 446 is capable of short-range wireless communication. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, and a Wi-Fi technology.

The computing device 400 typically includes at least some form of computer-readable media. Computer readable media includes any available media that can be accessed by the computing device 400. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 400. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 32 is also an example of programmable electronics, which may include one or more such computing devices, and when multiple computing devices are included, such computing devices can be coupled together with a suitable data communication network so as to collectively perform the various functions, methods, or operations disclosed herein.

Referring again to FIG. 32, the computing device 400 can include a location identification device 448. The location identification device 448 is configured to identify the location or geolocation of the computing device 400. The location identification device 448 can use various types of geolocating or positioning systems, such as network-based systems, handset-based systems, SIM-based systems, Wi-Fi positioning systems, and hybrid positioning systems. Network-based systems utilize service provider's network infrastructure, such as cell tower triangulation. Handset-based systems typically use the Global Positioning System (GPS). Wi-Fi positioning systems can be used when GPS is inadequate due to various causes including multipath and signal blockage indoors. Hybrid positioning systems use a combination of network-based and handset-based technologies for location determination, such as Assisted GPS.

The principles, configurations, and structures as described herein is applicable to deck systems and fence systems, which are collectively referred to herein as a deck system.

It will be apparent to those skilled in the art that various modifications or variations may be made without departing from the scope or spirit of the embodiments described herein. Other embodiments will be apparent to those skilled in the art from consideration of the specification and practice of the embodiments described herein.

What is claimed is:

1. A deck system comprising:
a plurality of stationary balusters disposed between an upper railing device and a lower railing device, adjacent ones of the stationary balusters arranged at a predetermined distance to define a baluster gap therebetween;
a plurality of movable balusters disposed between the upper railing device and the lower railing device, adjacent ones of the movable balusters arranged at the predetermined distance, the plurality of movable balusters movable relative to the plurality of stationary balusters;
a motorized baluster actuator device configured to move the plurality of movable balusters from an open position to a closed position, wherein the plurality of movable balusters are positioned in the open position to at least partially open the baluster gap between the adjacent ones of the stationary balusters, and the plurality of movable balusters are positioned in the closed position to close the baluster gap between the adjacent ones of the stationary balusters; and a safety slip mechanism comprising at least one magnet and configured to couple the motorized baluster actuator device to the movable balusters when movement of the movable balusters is unobstructed and to decouple the motorized baluster actuator device from the movable balusters when movement is obstructed.

2. The deck system of claim 1, wherein, in the closed position, the baluster actuator device operates to move the plurality of movable balusters at least partially within the baluster gaps.

3. The deck system of claim 1, wherein, in the closed position, the baluster actuator device operates to move the plurality of movable balusters within the baluster gaps to be in line with the plurality of stationary balusters.

4. The deck system of claim 1, further comprising an upper track arranged at the upper railing device, and a lower track arranged at the lower railing device, and wherein the motorized baluster actuator device is configured to slide the plurality of movable balusters along the upper and lower tracks.

5. The deck system of claim 1, wherein the upper and lower railing devices are curved, such that the movable balusters are moved at an angle to stationary balusters.

6. The deck system of claim 1, wherein the baluster actuator device comprises:
a rotating gear mechanism including a rotating gear engaging at least one of the plurality of movable balusters and moving the plurality of movable balusters relative to the plurality of stationary balusters; and
a guide mechanism configured to guide the plurality of movable balusters relative to the plurality of stationary balusters between the open position and the closed position.

7. The deck system of claim 6, wherein the guide mechanism includes a first guide rail against which a movable baluster slides to position between the open position and the closed position.

8. The deck system of claim 7, wherein the first guide rail has a straight portion extending in parallel with a corresponding stationary baluster, and an angled portion angled adjacent an end of the corresponding stationary baluster and extending toward a gap between the corresponding stationary baluster and an adjacent stationary baluster.

9. The deck system of claim 8, wherein the guide mechanism includes a baluster rail attached to the movable baluster and configured to slide against the first guide rail.

10. The deck system of claim 9, wherein the guide mechanism includes a rail bracket attached to the movable baluster to fix the baluster rail to the movable baluster.

11. The deck system of claim 9, wherein the baluster rail includes a straight portion extending in parallel with the corresponding stationary baluster, and an angled portion extending from an end of the straight portion of the baluster rail at an angle away from the corresponding stationary baluster.

12. The deck system of claim 11, wherein the straight portion of the baluster rail is configured to slide against the straight portion of the first guide rail and the angled portion of the baluster rail is configured to slide against the angled portion of the first guide rail.

13. The deck system of claim 1, wherein at least one of the balusters comprises:

a baluster panel unit defining a module insert; and
one or more functional modules configured to be secured to the module insert.

14. The deck system of claim 13, wherein the module insert includes a groove extending at least partially along a length of the baluster panel unit.

15. The deck system of claim 13, wherein the functional modules are selected from a group consisting of include at least one of a communication module, a battery pack module, a light module, a speaker module, and a solar panel module.

16. The deck system of claim 13, wherein the one or more functional modules include a plurality of functional modules, and further comprising a panel filler insert module configured to be secured to the module insert to fill a gap between adjacent ones of the plurality of functional modules secured to the module insert.

17. The deck system of claim 13, wherein the baluster panel unit includes a drain element arranged at a lower end of the module insert and configured to collect moisture and redirect the moisture out from the baluster panel.

18. The deck system of claim 17, wherein the drain element includes a recess defined on a lower interior surface of the module insert.

19. The deck system of claim 18, wherein the drain element includes a discharge channel defined on the baluster panel and extending downwardly from the recess.

20. A deck system comprising:
a plurality of stationary balusters disposed between an upper railing device and a lower railing device, adjacent ones of the stationary balusters arranged at a predetermined distance to define a baluster gap therebetween;
a plurality of movable balusters disposed between the upper railing device having an upper channel, and the lower railing device having a lower channel, adjacent ones of the movable balusters arranged at the predetermined distance, the plurality of movable balusters movable relative to the plurality of stationary balusters;
a motorized baluster actuator device configured to move the plurality of movable balusters from an open position to a closed position, wherein the plurality of movable balusters are positioned in the open position to at least partially open the baluster gap between the adjacent ones of the stationary balusters, and the plurality of movable balusters are positioned in the closed position to close the baluster gap between the adjacent ones of the stationary balusters; and
a control screw and engaging nut coupled to the motorized baluster actuator device configured to move the plurality of movable balusters by rotational force so as to slide the movable balusters along the upper and lower channels until they are seated in the baluster gaps between the stationary balusters, wherein the control screw is rotatable in a first direction by the motorized baluster actuator device to move the movable balusters to the closed position and is rotatable in a second direction by the motorized baluster actuator device to move the movable balusters to the open position.

21. The deck system of claim 20, further comprising:
a safety slip mechanism comprising at least one magnet and configured to couple the motorized baluster actuator device to the movable balusters when movement of the movable balusters is unobstructed and to decouple the motorized baluster actuator device from the movable balusters when movement is obstructed.

22. The deck system of claim 20, wherein at least one of the balusters comprises:

a baluster panel unit defining a module insert; and
one or more functional modules configured to be secured to the module insert.

\* \* \* \* \*